(12) United States Patent
Berkowitz et al.

(10) Patent No.: US 10,447,055 B1
(45) Date of Patent: Oct. 15, 2019

(54) METHOD AND CIRCUITRY TO ADAPTIVELY CHARGE A BATTERY/CELL USING A CHARGE-TIME PARAMETER

(71) Applicant: Qnovo Inc., Newark, CA (US)

(72) Inventors: Fred Berkowitz, Los Gatos, CA (US); Dania Ghantous, Walnut Creek, CA (US); Christina Peabody, Fremont, CA (US)

(73) Assignee: Qnovo Inc., Newark, CA (US)

( * ) Notice: Subject to any disclaimer, the term of this patent is extended or adjusted under 35 U.S.C. 154(b) by 177 days.

(21) Appl. No.: 15/234,995

(22) Filed: Aug. 11, 2016

Related U.S. Application Data

(63) Continuation of application No. 14/252,422, filed on Apr. 14, 2014, now Pat. No. 9,461,492.

(60) Provisional application No. 61/814,188, filed on Apr. 19, 2013.

(51) Int. Cl.
*H02J 7/04* (2006.01)
*H02J 7/00* (2006.01)
*H02J 7/16* (2006.01)

(52) U.S. Cl.
CPC ............ *H02J 7/007* (2013.01); *H02J 7/0029* (2013.01)

(58) Field of Classification Search
CPC ................................ H02J 7/007; H02J 7/0029
USPC .................................................. 320/139, 155
See application file for complete search history.

(56) References Cited

U.S. PATENT DOCUMENTS

| | | |
|---|---|---|
| 4,680,241 A | 7/1987 | Dyer |
| 4,829,225 A | 5/1989 | Podrazhansky et al. |
| 5,410,238 A | 4/1995 | Ishizuka et al. |
| 5,442,274 A | 8/1995 | Tamai |
| 5,500,583 A | 3/1996 | Buckley et al. |
| 5,684,386 A | 11/1997 | Okada |
| 5,747,969 A | 5/1998 | Tamai |
| 5,773,955 A | 6/1998 | Hall |
| 5,808,447 A | 9/1998 | Hagino |
| 5,888,665 A | 3/1999 | Bugga et al. |

(Continued)

FOREIGN PATENT DOCUMENTS

| | | |
|---|---|---|
| CN | 1985183 A | 6/2007 |
| CN | 102577009 A | 7/2012 |

(Continued)

OTHER PUBLICATIONS

U.S. Appl. No. 61/044,160, filed Apr. 11, 2008, Greening et al.

(Continued)

*Primary Examiner* — Zixuan Zhou

(74) *Attorney, Agent, or Firm* — Weaver Austin Villeneuve & Sampson LLP

(57) ABSTRACT

Method and apparatus to charge a battery are disclosed. The method comprises applying a first charge signal to the battery, wherein the first charge signal is calculated to charge the battery as required by a first charge time parameter, the first charge-time parameter specifying a time to reach (i) a state of charge of the battery or (ii) a charge storage level corresponding to a usage time of the battery. The method further includes determining a second charge signal using feedback information and applying the second charge signal to the battery, wherein an adjustment from the first charge signal to the second charge signal improves a cycle life of the battery. An apparatus for charging the battery implementing the method is also provided.

28 Claims, 22 Drawing Sheets

(56) References Cited

U.S. PATENT DOCUMENTS

| | | | |
|---|---|---|---|
| 5,900,718 A | 5/1999 | Tsenter | |
| 5,905,364 A | 5/1999 | Ookita | |
| 5,923,149 A | 7/1999 | Umetsu | |
| 5,945,811 A * | 8/1999 | Hasegawa | H02J 7/0011 320/141 |
| 5,982,152 A | 11/1999 | Watanabe et al. | |
| 5,994,875 A | 11/1999 | Lee | |
| 6,040,685 A | 3/2000 | Tsenter et al. | |
| 6,043,631 A | 3/2000 | Tsenter | |
| 6,074,771 A | 6/2000 | Cobukcu et al. | |
| 6,094,033 A | 7/2000 | Ding et al. | |
| 6,097,172 A | 8/2000 | Podrazhansky et al. | |
| 6,127,804 A | 10/2000 | Oglesbee et al. | |
| 6,127,809 A | 10/2000 | Kates et al. | |
| 6,137,265 A | 10/2000 | Cummings et al. | |
| 6,144,187 A | 11/2000 | Bryson | |
| 6,154,011 A | 11/2000 | Lam et al. | |
| 6,194,867 B1 | 2/2001 | Cummings et al. | |
| 6,204,634 B1 | 3/2001 | Zimmerman et al. | |
| 6,215,281 B1 | 4/2001 | Koch | |
| 6,259,231 B1 | 7/2001 | Hansen | |
| 6,262,577 B1 | 7/2001 | Nakao et al. | |
| 6,307,353 B1 | 10/2001 | Shiojima | |
| 6,313,605 B1 | 11/2001 | Tsenter | |
| 6,362,598 B2 | 3/2002 | Laig-Horstebrock et al. | |
| 6,366,056 B1 | 4/2002 | Podrazhansky et al. | |
| 6,377,028 B1 | 4/2002 | Armstrong, II et al. | |
| 6,441,585 B1 | 8/2002 | Bertness | |
| 6,441,586 B1 | 8/2002 | Tate, Jr. et al. | |
| 6,456,988 B1 | 9/2002 | Singh et al. | |
| 6,469,471 B1 | 10/2002 | Anbuky et al. | |
| 6,532,425 B1 | 3/2003 | Boost et al. | |
| 6,630,814 B2 | 10/2003 | Ptasinski et al. | |
| 6,631,293 B2 | 10/2003 | Lyden | |
| 6,646,419 B1 | 11/2003 | Ying | |
| 6,707,272 B1 | 3/2004 | Thandiwe | |
| 6,789,026 B2 | 9/2004 | Barsoukov et al. | |
| 6,832,171 B2 | 12/2004 | Barsoukov et al. | |
| 6,833,686 B2 | 12/2004 | Veselic et al. | |
| 6,841,974 B2 | 1/2005 | Dykeman | |
| 6,892,148 B2 | 5/2005 | Barsoukov et al. | |
| 6,924,622 B1 | 8/2005 | Anbuky et al. | |
| 7,005,830 B2 | 2/2006 | Moore et al. | |
| 7,034,503 B2 | 4/2006 | Veselic et al. | |
| 7,072,871 B1 | 7/2006 | Tinnemeyer | |
| 7,180,298 B2 | 2/2007 | Nakamura et al. | |
| 7,199,557 B2 | 4/2007 | Anbuky et al. | |
| 7,205,748 B2 | 4/2007 | Nishida et al. | |
| 7,227,336 B1 | 6/2007 | van-Schalkwijk et al. | |
| 7,245,107 B2 | 7/2007 | Moore et al. | |
| 7,248,023 B2 | 7/2007 | Takezawa et al. | |
| 7,324,902 B2 | 1/2008 | Verbrugge et al. | |
| 7,362,074 B2 | 4/2008 | Iwane et al. | |
| 7,402,980 B2 | 7/2008 | Al-Anbuky et al. | |
| 7,405,538 B1 | 7/2008 | Hoff et al. | |
| 7,492,130 B2 | 2/2009 | Daboussi | |
| 7,557,541 B2 | 7/2009 | Marinka-Tóth et al. | |
| 7,570,015 B2 | 8/2009 | Bansal et al. | |
| 7,595,611 B2 | 9/2009 | Reynier et al. | |
| 7,626,394 B2 | 12/2009 | Kimura et al. | |
| 7,737,665 B2 | 6/2010 | Grewe et al. | |
| 7,772,804 B2 | 8/2010 | Bhardwaj et al. | |
| 7,788,052 B2 | 8/2010 | Iwane et al. | |
| 8,036,839 B2 | 10/2011 | Machiyama et al. | |
| 8,040,106 B2 | 10/2011 | Ishikawa | |
| 8,044,635 B2 | 10/2011 | Peterson | |
| 8,159,183 B2 | 4/2012 | Choi et al. | |
| 8,244,177 B2 | 8/2012 | Zyambo et al. | |
| 8,350,531 B2 | 1/2013 | Morimoto et al. | |
| 8,368,357 B2 | 2/2013 | Ghantous et al. | |
| 8,427,112 B2 | 4/2013 | Ghantous et al. | |
| 8,513,921 B2 | 8/2013 | Berkowitz et al. | |
| 8,531,158 B2 | 9/2013 | Wang et al. | |
| 8,638,070 B2 | 1/2014 | Maluf et al. | |
| 8,791,669 B2 | 7/2014 | Ghantous et al. | |
| 8,963,494 B2 | 2/2015 | Kishiyama et al. | |
| 8,970,178 B2 | 3/2015 | Berkowitz et al. | |
| 8,975,874 B2 | 3/2015 | Berkowitz et al. | |
| 9,035,621 B2 | 5/2015 | Berkowitz et al. | |
| 9,035,623 B1 | 5/2015 | Berkowitz et al. | |
| 9,063,018 B1 | 6/2015 | Ghantous et al. | |
| 9,121,910 B2 | 9/2015 | Maluf et al. | |
| 9,142,994 B2 | 9/2015 | Berkowitz et al. | |
| 9,263,900 B2 | 2/2016 | Ju et al. | |
| 9,270,134 B2 | 2/2016 | Gaddam et al. | |
| 9,373,972 B2 | 6/2016 | Ghantous et al. | |
| 9,385,555 B2 | 7/2016 | Ghantous et al. | |
| 9,461,492 B1 | 10/2016 | Berkowitz et al. | |
| 9,702,940 B2 | 7/2017 | Maluf et al. | |
| 9,726,554 B1 | 8/2017 | Ghantous et al. | |
| 9,787,122 B2 | 10/2017 | Berkowitz et al. | |
| 9,791,513 B2 | 10/2017 | Maluf et al. | |
| 10,067,198 B2 | 9/2018 | Maluf et al. | |
| 10,389,156 B2 | 8/2019 | Berkowitz et al. | |
| 2001/0011881 A1 | 8/2001 | Emori et al. | |
| 2001/0017243 A1 | 8/2001 | Tajima et al. | |
| 2002/0001745 A1 | 1/2002 | Gartstein et al. | |
| 2002/0070706 A1 | 6/2002 | Champlin | |
| 2002/0075003 A1 | 6/2002 | Fridman et al. | |
| 2002/0109504 A1 | 8/2002 | Champlin | |
| 2002/0117997 A1 | 8/2002 | Feil et al. | |
| 2003/0003363 A1 | 1/2003 | Daido et al. | |
| 2003/0206021 A1 | 11/2003 | Laletin et al. | |
| 2004/0032237 A1 | 2/2004 | Dykeman | |
| 2004/0038087 A1 | 2/2004 | Shiue et al. | |
| 2005/0156577 A1 | 7/2005 | Sully | |
| 2005/0189948 A1 | 9/2005 | Koch | |
| 2005/0194938 A1 | 9/2005 | Sanpei | |
| 2005/0214646 A1 | 9/2005 | Kubota | |
| 2005/0248314 A1 | 11/2005 | James | |
| 2005/0264263 A1 | 12/2005 | Tsenter | |
| 2006/0001406 A1 | 1/2006 | Matan | |
| 2006/0093894 A1 | 5/2006 | Scott et al. | |
| 2006/0145658 A1 | 7/2006 | Wang | |
| 2006/0181245 A1 | 8/2006 | Mizuno et al. | |
| 2006/0186890 A1 | 8/2006 | Iwane et al. | |
| 2006/0208701 A1 | 9/2006 | Mikhaylik | |
| 2006/0238168 A1 | 10/2006 | Matsuo et al. | |
| 2007/0132456 A1 | 6/2007 | Salman et al. | |
| 2007/0170890 A1 | 7/2007 | Fee et al. | |
| 2007/0194756 A1 | 8/2007 | Cutrona | |
| 2007/0216359 A1 | 9/2007 | Arai et al. | |
| 2007/0229034 A1 * | 10/2007 | Tatebayashi | H01M 10/052 320/132 |
| 2007/0236225 A1 | 10/2007 | Tsenter et al. | |
| 2007/0257681 A1 | 11/2007 | Christophersen et al. | |
| 2008/0003490 A1 | 1/2008 | Christensen et al. | |
| 2008/0079396 A1 | 4/2008 | Yamazaki et al. | |
| 2008/0079397 A1 | 4/2008 | Fee et al. | |
| 2008/0211459 A1 | 9/2008 | Choi | |
| 2009/0027006 A1 | 1/2009 | Vezzini et al. | |
| 2009/0027007 A1 | 1/2009 | Iwane et al. | |
| 2009/0027056 A1 | 1/2009 | Huang et al. | |
| 2009/0146664 A1 | 6/2009 | Zhang | |
| 2009/0195214 A1 | 8/2009 | Gehrke et al. | |
| 2009/0212626 A1 | 8/2009 | Snyder et al. | |
| 2009/0326842 A1 | 9/2009 | Thomas-Alyea | |
| 2009/0256528 A1 | 10/2009 | Greening et al. | |
| 2009/0259420 A1 | 10/2009 | Greening et al. | |
| 2009/0273320 A1 | 11/2009 | Ungar et al. | |
| 2009/0295337 A1 | 12/2009 | Ishikawa | |
| 2009/0325056 A1 | 12/2009 | Greening et al. | |
| 2010/0000809 A1 | 1/2010 | Nishi et al. | |
| 2010/0039116 A1 | 2/2010 | Tsenter et al. | |
| 2010/0060240 A1 | 3/2010 | Karoui et al. | |
| 2010/0066310 A1 | 3/2010 | Biggs, Jr. | |
| 2010/0072951 A1 | 3/2010 | Nakashima | |
| 2010/0072955 A1 | 3/2010 | Ishikawa | |
| 2010/0085022 A1 | 4/2010 | Shimizu et al. | |
| 2010/0109443 A1 | 5/2010 | Cook et al. | |
| 2010/0134305 A1 | 6/2010 | Lu et al. | |
| 2010/0164437 A1 | 7/2010 | McKinley et al. | |
| 2010/0213901 A1 | 8/2010 | Morimoto et al. | |
| 2010/0219795 A1 | 9/2010 | Morimoto et al. | |

(56) References Cited

U.S. PATENT DOCUMENTS

| | | |
|---|---|---|
| 2011/0037439 A1 | 2/2011 | Bhardwaj et al. |
| 2011/0089907 A1 | 4/2011 | Bhardwaj et al. |
| 2011/0254377 A1 | 10/2011 | Wildmer et al. |
| 2011/0285356 A1* | 11/2011 | Maluf .............. H02J 7/0052 320/139 |
| 2011/0316548 A1 | 12/2011 | Ghantous et al. |
| 2012/0025756 A1 | 2/2012 | Xu et al. |
| 2012/0032648 A1 | 2/2012 | Ghantous et al. |
| 2012/0038325 A1 | 2/2012 | Morita et al. |
| 2012/0200266 A1 | 8/2012 | Berkowitz et al. |
| 2012/0203483 A1 | 8/2012 | Ghantous et al. |
| 2012/0235636 A1 | 9/2012 | Partovi |
| 2012/0242285 A1 | 9/2012 | Jung et al. |
| 2012/0280650 A1 | 11/2012 | Kim et al. |
| 2012/0310565 A1 | 12/2012 | Redey |
| 2013/0026976 A1 | 1/2013 | Lu |
| 2013/0062966 A1 | 3/2013 | Verghese et al. |
| 2013/0083722 A1 | 4/2013 | Bhargava et al. |
| 2013/0154548 A1 | 6/2013 | Berkowitz et al. |
| 2014/0021959 A1 | 1/2014 | Maluf et al. |
| 2014/0079969 A1 | 3/2014 | Greening et al. |
| 2014/0084846 A1 | 3/2014 | Berkowitz et al. |
| 2014/0139192 A1 | 5/2014 | Berkowitz et al. |
| 2014/0183970 A1 | 7/2014 | Kurihara et al. |
| 2014/0247004 A1 | 9/2014 | Kari et al. |
| 2014/0266068 A1 | 9/2014 | O'Brien et al. |
| 2014/0312912 A1 | 10/2014 | Berkowitz et al. |
| 2015/0091496 A1 | 4/2015 | Meunier et al. |
| 2015/0153417 A1 | 6/2015 | Maluf et al. |
| 2015/0155734 A1 | 6/2015 | Ghantous et al. |
| 2015/0219722 A1 | 8/2015 | Maluf et al. |
| 2015/0357841 A1 | 12/2015 | Berkowitz et al. |
| 2015/0377976 A1 | 12/2015 | Maluf et al. |
| 2015/0380957 A1 | 12/2015 | Ghantous et al. |
| 2016/0028268 A1 | 1/2016 | Fisher-Jeffes et al. |
| 2016/0106370 A1 | 4/2016 | Filipovic et al. |
| 2017/0346305 A1 | 11/2017 | Berkowitz et al. |
| 2018/0090947 A1 | 3/2018 | Berkowitz et al. |

FOREIGN PATENT DOCUMENTS

| | | |
|---|---|---|
| EP | 1 191 622 A1 | 3/2002 |
| WO | WO 00/013288 | 3/2000 |
| WO | WO 00/075678 | 12/2000 |
| WO | WO 02/021149 | 3/2002 |
| WO | WO 02/021662 | 3/2002 |
| WO | WO 02/041466 | 5/2002 |
| WO | WO 02/093712 | 11/2002 |
| WO | WO 03/107505 | 12/2003 |
| WO | WO 2004/017485 | 2/2004 |
| WO | WO 2004/109311 | 12/2004 |
| WO | WO 2005/003800 | 1/2005 |
| WO | WO 2005/101042 | 10/2005 |
| WO | WO 2005/114808 | 12/2005 |
| WO | WO 2006/057468 | 6/2006 |
| WO | WO 2007/004098 | 1/2007 |
| WO | WO 2008/117239 | 10/2008 |
| WO | WO 2008/128429 | 10/2008 |
| WO | WO 2009/025944 | 2/2009 |
| WO | WO 2009/126734 | 10/2009 |
| WO | WO 2009/126797 | 10/2009 |
| WO | WO 2010/096180 | 8/2010 |
| WO | WO 2011/146783 | 11/2011 |
| WO | WO 2012/135148 | 10/2012 |

OTHER PUBLICATIONS

U.S. Appl. No. 61/089,246, filed Aug. 15, 2008, Greening et al.
U.S. Appl. No. 14/252,422, filed Apr. 14, 2014, Berkowitz et al.
U.S. Appl. No. 14/712,068, filed May 14, 2015, Ghantous et al.
U.S. Office Action dated Jun. 18, 2013 issued in U.S. Appl. No. 13/111,902.
U.S. Notice of Allowance dated Sep. 12, 2013 issued in U.S. Appl. No. 13/111,902.
U.S. Office Action dated Sep. 30, 2014 issued in U.S. Appl. No. 14/161,755.
U.S. Notice of Allowance dated Nov. 10, 2014 issued in U.S. Appl. No. 14/161,755.
U.S. Notice of Allowance [Corrected Notice of Allowability] dated Jan. 22, 2015 issued in U.S. Appl. No. 14/161,755.
U.S. Office Action dated Dec. 31, 2015 issued in U.S. Appl. No. 14/615,491.
U.S. Notice of Allowance dated Mar. 1, 2016 issued in U.S. Appl. No. 14/615,491.
U.S. Notice of Allowance dated May 31, 2016 issued in U.S. Appl. No. 14/615,491.
U.S. Office Action dated Dec. 31, 2015 issued in U.S. Appl. No. 14/851,921.
U.S. Notice of Allowance dated Mar. 21, 2016 issued in U.S. Appl. No. 14/851,921.
U.S. Notice of Allowance [Supplemental Notice of Allowability] dated Jun. 1, 2016 issued in U.S. Appl. No. 14/851,921.
U.S. Office Action dated Oct. 23, 2013 issued in U.S. Appl. No. 13/167,782.
U.S. Notice of Allowance dated Mar. 27, 2014 issued in U.S. Appl. No. 13/167,782.
U.S. Office Action dated Jun. 26, 2012 issued in U.S. Appl. No. 13/271,340.
U.S. Final Office Action dated Nov. 7, 2012 issued in U.S. Appl. No. 13/271,340.
U.S. Notice of Allowance dated Jan. 25, 2013 issued in U.S. Appl. No. 13/271,340.
U.S. Office Action dated Mar. 28, 2012 issued in U.S. Appl. No. 13/271,910.
U.S. Notice of Allowance dated Oct. 5, 2012 issued in U.S. Appl. No. 13/271,910.
U.S. Office Action dated Apr. 24, 2013 issued in U.S. Appl. No. 13/767,839.
U.S. Notice of Allowance dated May 14, 2013 issued in U.S. Appl. No. 13/767,839.
U.S. Notice of Allowance dated Jan. 9, 2015 issued in U.S. Appl. No. 14/322,863.
U.S. Notice of Allowance dated Oct. 23, 2014 issued in U.S. Appl. No. 13/366,352.
U.S. Office Action dated May 17, 2016 issued in U.S. Appl. No. 14/615,486.
U.S. Notice of Allowance dated Mar. 27, 2015 issued in U.S. Appl. No. 14/003,826.
U.S. Office Action dated Dec. 9, 2014 issued in U.S. Appl. No. 13/626,605.
U.S. Notice of Allowance dated May 20, 2015 issued in U.S. Appl. No. 13/626,605.
U.S. Notice of Allowance dated Mar. 3, 2015 issued in U.S. Appl. No. 13/657,841.
U.S. Office Action dated Jun. 19, 2013 issued in U.S. Appl. No. 13/747,914.
U.S. Final Office Action dated Nov. 8, 2013 issued in U.S. Appl. No. 13/747,914.
U.S. Notice of Allowance dated Jan. 21, 2015 issued in U.S. Appl. No. 13/747,914.
U.S. Office Action dated Jul. 3, 2014 issued in U.S. Appl. No. 14/252,422.
U.S. Final Office Action dated Dec. 30, 2014 issued in U.S. Appl. No. 14/252,422.
U.S. Office Action dated Aug. 27, 2015 issued in U.S. Appl. No. 14/252,422.
U.S. Notice of Allowance dated Jun. 24, 2016 issued in U.S. Appl. No. 14/252,422.
U.S. Notice of Allowance (Corrected Notice of Allowability) dated Aug. 29, 2016 issued in U.S. Appl. No. 14/252,422.
PCT International Search Report and Written Opinion, dated Jul. 26, 2011, issued in PCT/US2011/037255.
PCT International Preliminary Report on Patentability, dated Dec. 6, 2012, issued in PCT/US2011/037255.
Chinese First Office Action, dated Aug. 1, 2014, issued in CN 201180025100.4.

(56) References Cited

OTHER PUBLICATIONS

Chinese Second Office Action, dated Apr. 16, 2015, issued in CN 201180025100.4.
PCT International Search Report and Written Opinion, dated Jul. 13, 2012, issued in PCT/US2012/030618.
PCT International Preliminary Report on Patentability and Written Opinion, dated Oct. 10, 2013, issued in PCT/US2012/030618.
Landau et al., (2005) Reduced Mass Transport Limitations by Application of Special Pulse Current modes, *J. of Electrochemical Soc.*, 152(4):J33-J39.
Landau et al., (2006) "Rapid Charging of Lithium-Ion Batteries using Pulsed Currents," *J. of Electrochemical Soc.*, 153(3):A533-A542.
Ning et al. (2004) Cycle Life Modeling of Lithium-ion Batteries, *J. of Electrochemical Soc.*, 151(10):A1584-A1591.
Ning et al. (2006) "A Generalized Cycle Life Model of Rechargeable Lithium-Ion Batteries," *Electrochimica Acta*, 51:2012-2022.
Persson et al. (2010) "Lithium Diffusion in Graphitic Carbon," *J. Phys. Chem. Letters*, 1:1176-1180.
Piao et al. (1999) "Intercalation of Lithium Ions into Graphite Electrodes Studied by AC Impedance Measurements," *J. of Electrochemical Soc.*, 146(8):2794-2798.
Santhanagopalan et al., (2006) "Online estimation of the state of charge of a lithium ion cell," *Journal of Power Sources, Elsevier, B. V.* 161:1346-1355.
U.S. Office Action dated Nov. 28, 2016 issued in U.S. Appl. No. 14/684,371.
U.S. Notice of Allowance dated Jun. 8, 2017 issued in U.S. Appl. No. 14/684,371.
U.S. Notice of Allowance [Supplemental Notice of Allowability] dated Jul. 3, 2017 issued in U.S. Appl. No. 14/684,371.
U.S. Notice of Allowance [Supplemental Notice of Allowability] dated Sep. 21, 2017 issued in U.S. Appl. No. 14/684,371.
U.S. Office Action dated Sep. 28, 2016 issued in U.S. Appl. No. 14/615,486.
U.S. Notice of Allowance dated Feb. 21, 2017 issued in U.S. Appl. No. 14/615,486.
U.S. Notice of Allowance [Supplemental Notice of Allowability] dated Apr. 18, 2017 issued in U.S. Appl. No. 14/615,486.
U.S. Notice of Allowance [Supplemental Notice of Allowability] dated Jun. 12, 2017 issued in U.S. Appl. No. 14/615,486.
U.S. Office Action dated Aug. 17, 2017 issued in U.S. Appl. No. 14/752,592.
U.S. Final Office Action dated Jan. 8, 2018 issued in U.S. Appl. No. 14/752,592.
Notice of Allowance dated Apr. 30, 2018 issued in U.S. Appl. No. 14/752,592.
U.S. Office Action dated Feb. 1, 2017 issued in U.S. Appl. No. 14/828,235.
U.S. Notice of Allowance dated May 17, 2017 issued in U.S. Appl. No. 14/828,235.
U.S. Office Action dated Apr. 25, 2018 issued in U.S. Appl. No. 15/681,071.
U.S. Office Action dated May 16, 2018 issued in U.S. Appl. No. 15/730,670.
U.S. Notice of Allowance dated Apr. 4, 2017 issued in U.S. Appl. No. 14/712,068.
Korean Office Action dated Mar. 22, 2017 issued in KR 10-2012-7033330.
Chinese First Office Action, dated Oct. 17, 2016, issued in CN 201310450976.4.
Chinese Notice of Allowance and Search Report, dated Jun. 19, 2017, issued in CN 201310450976.4.
U.S. Appl. No. 14/743,769, filed Jun. 18, 2015, Berkowitz et al.
U.S. Appl. No. 16/107,560, filed Aug. 21, 2018, Maluf et al.
U.S. Office Action dated Apr. 5, 2017 issued in U.S. Appl. No. 14/743,769.
U.S. Final Office Action dated Nov. 30, 2017 issued in U.S. Appl. No. 14/743,769.
U.S. Office Action dated Jul. 2, 2018 issued in U.S. Appl. No. 14/743,769.
U.S. Notice of Allowance dated May 23, 2019 issued in U.S. Appl. No. 15/730,670.
U.S. Appl. No. 16/459,824, dated Jul. 2, 2019, Berkowitz et al.
US Notice of Allowance dated Jul. 12, 2019 issued in U.S. Appl. No. 14/743,769.

\* cited by examiner

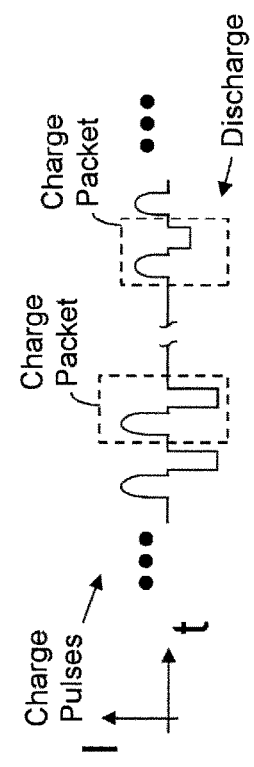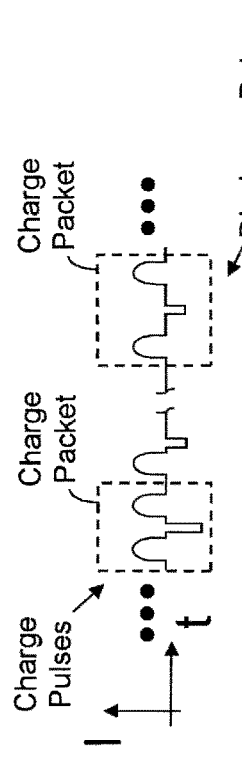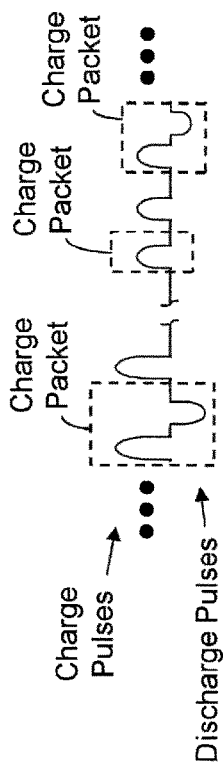

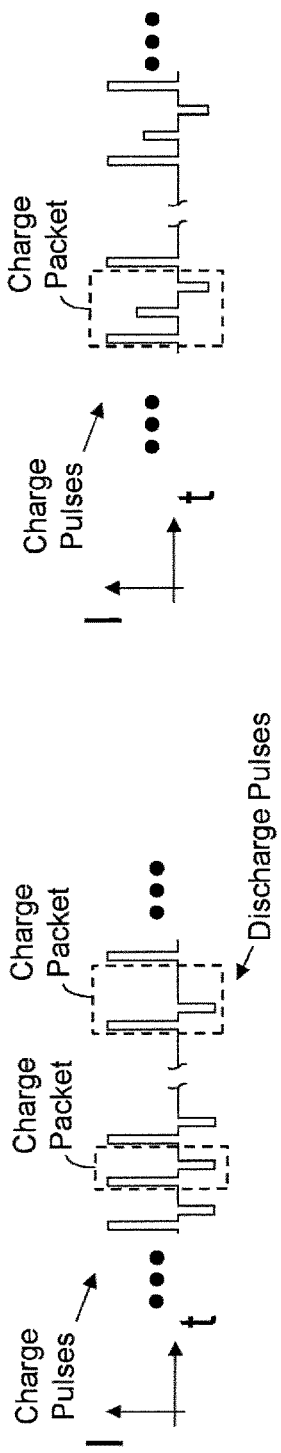
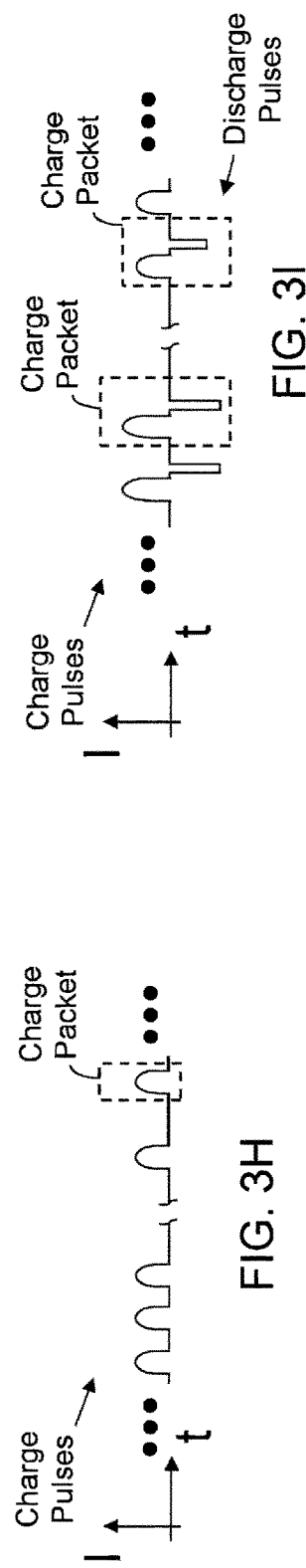
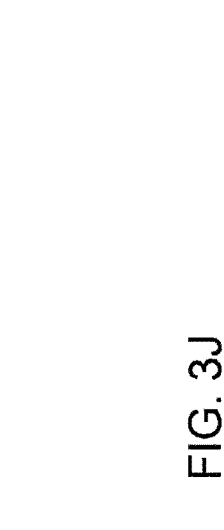
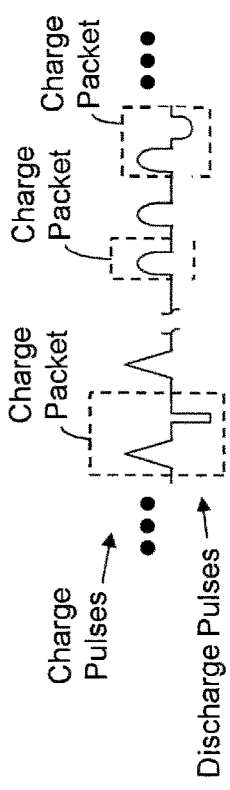
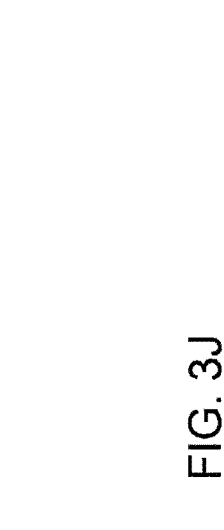
FIG. 3F
FIG. 3G
FIG. 3H
FIG. 3I
FIG. 3J

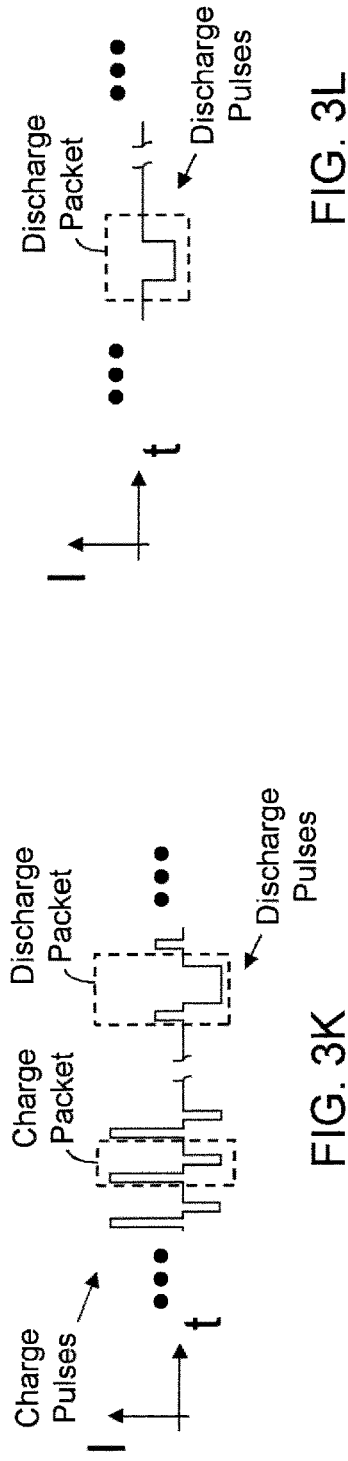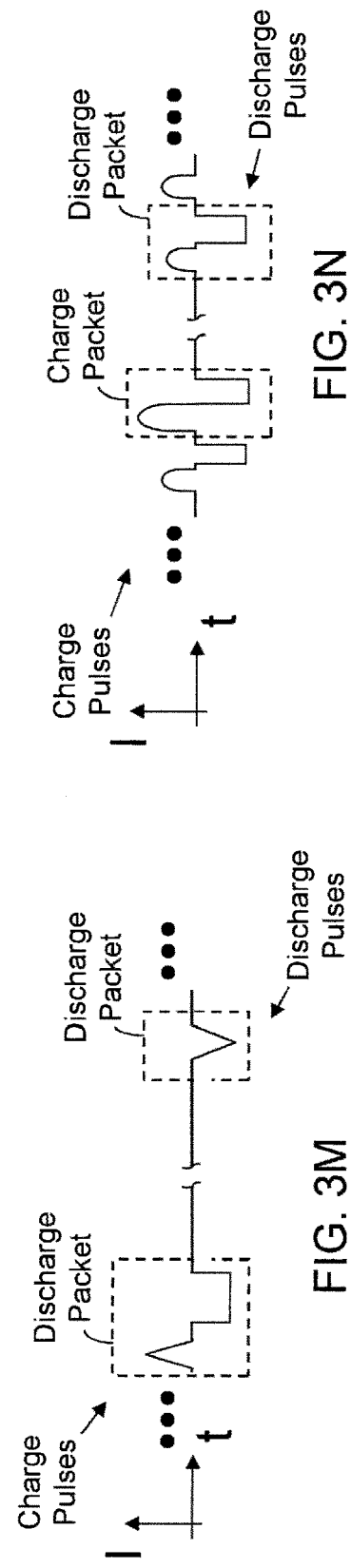
FIG. 3K
FIG. 3L
FIG. 3M
FIG. 3N

US 10,447,055 B1

METHOD AND CIRCUITRY TO ADAPTIVELY CHARGE A BATTERY/CELL USING A CHARGE-TIME PARAMETER

RELATED APPLICATION

This application is a continuation application of U.S. patent application Ser. No. 14/252,422, entitled "Method and Circuitry to Adaptively Charge a Battery/Cell using a Charge-Time Parameter", filed Apr. 14, 2014, which claims priority to U.S. Provisional Application No. 61/814,188, entitled "Method and Circuitry to Adaptively Charge a Battery/Cell using a Charge-Time Parameter", filed Apr. 19, 2013, all documents aforementioned being incorporated by reference in their entireties for all purposes.

INTRODUCTION

In one aspect, the present inventions relate to circuitry for and methods of adaptively charging or re-charging (hereinafter collectively "charging") a battery/cell using, among other things, a charge-time parameter (for example, an absolute or relative type charge-time parameter). The charge-time parameter may be characterized as defining, correlating and/or associating a charge time period (during which the battery is undergoing charging by the charging circuitry) in relation to (i) a state of charge (SOC) of the battery/cell and/or (ii) a charge storage level corresponding to an amount of usage time of the battery/cell (for example, in relation to a given load (i.e., a given current consumption of, for example, an associated electrical device)). For example, in one embodiment, the adaptive charging techniques and/or circuitry uses and/or employs a charge-time parameter, in connection with certain considerations, constraints and/or requirements (that will be described below), to provide a charging sequence of the battery/cell which provides a given SOC of the battery/cell in or within a given amount of time of charging the battery/cell. In another embodiment, the adaptive charging techniques and/or circuitry uses and/or employs a charge-time parameter to implement, adapt, modify and/or change a charge sequence, cycle or operation of the battery/cell to provide a charge storage level corresponding to an amount of usage time of the battery/cell (for example, a normal operating usage of the battery/cell by an associated device being powered thereby) in or within a given amount of time of charging the battery/cell.

BRIEF DESCRIPTION OF THE DRAWINGS

The present inventions may be implemented in connection with embodiments illustrated in the attached drawings. These drawings show different aspects of the present inventions and, where appropriate, reference numerals illustrating like structures, components, materials and/or elements in different figures are labeled similarly. It is understood that various combinations of the structures, components, and/or elements, other than those specifically shown, are contemplated and are within the scope of the present inventions.

Moreover, there are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein. Notably, an embodiment or implementation described herein as "exemplary" is not to be construed as preferred or advantageous, for example, over other embodiments or implementations; rather, it is intended reflect or indicate the embodiment(s) is/are "example" embodiment(s).

FIG. 1C illustrates circuitry external which accesses the memory to store data (for example, one or more predetermined ranges) employed by control circuitry in conjunction with adapting, adjusting and/or controlling one or more characteristics of the charge or current applied to or injected into the battery/cell so that the charging sequence, operation or cycle meets, satisfies and/or complies with a charge-time parameter;

FIGS. 3A-3N illustrate exemplary charge and/or discharge packets of the charging and discharging signals (which are exemplary illustrated in FIGS. 3A-3D), wherein such charge and discharge packets may include one or more charge pulses and one or more discharge pulses; notably, in one embodiment, each charge signal of FIGS. 2A-2D may include a plurality of packets (for example, about 100 to about 50,000 packets) and, in one embodiment, each packet may include a plurality of charge pulses, discharge pulses and rest periods; notably, the pulses may be any shape (for example, rectangular, triangle, sinusoidal or square); in one exemplary embodiment, the charge and/or discharge pulses of the packet may include a temporal duration of between about 1 ms to about 2000 ms, and preferably less than 1000 ms; moreover, as discussed in detail below, one, some or all of the characteristics of the charge and discharge pulses (for example, pulse amplitude, pulse width/duration and pulse shape) are programmable and/or controllable via charging circuitry wherein the amplitude of the positive and/or negative pulses may vary within the packet (and are programmable and/or controllable), the duration and/or timing of the rest periods may vary within the packet (and are programmable and/or controllable) and/or, in addition, such pulses may be equally or unequally spaced within the packet; the combination of charging pulses, discharging pulses and rest periods may be repetitive and thereby forms a packet that may be repeated; all combinations or permutations of pulse, pulse characteristics, periods, packets and signal characteristics and configurations are intended to fall within the scope of the present inventions; notably, such one or more charge pulses and/or one or more discharge pulses (including, for example, pulses of charge and/or discharge packets) may be generated via the controllable switch(es) of the charging circuitry (see, e.g., FIG. 1E);

Figure 1B:
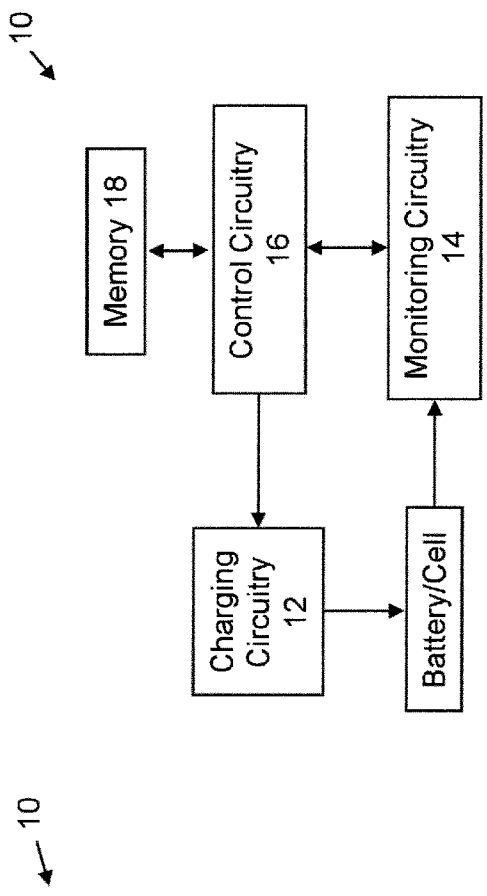
FIGS. 1A-1C illustrate block diagram representations of exemplary adaptive charging circuitry in conjunction with a battery/cell, according to at least certain aspects of certain embodiments of the present inventions, wherein FIG. 1B includes discrete memory coupled to the control circuitry.
Figure 1A:
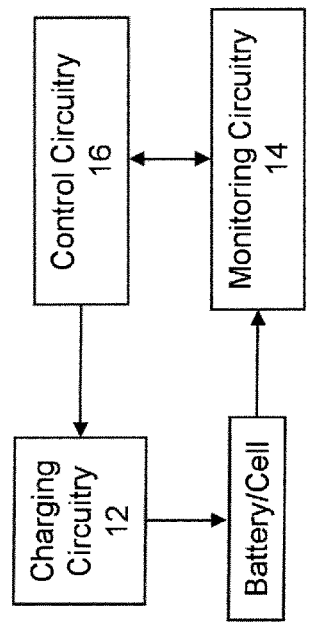
Figure 1C:
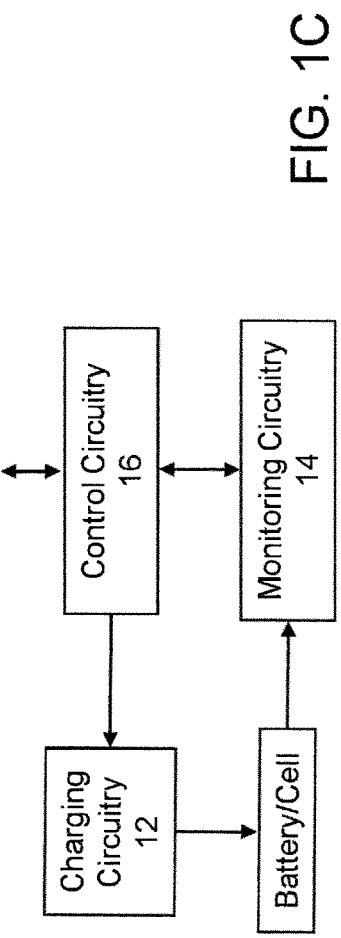
Figure 1D:
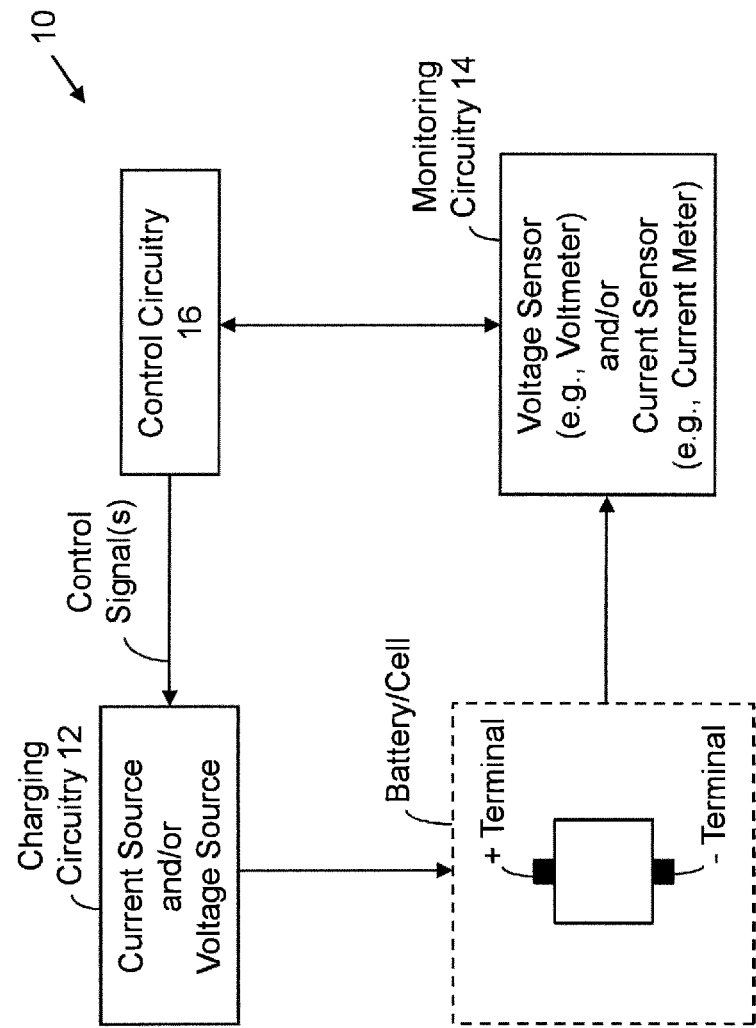
FIGS. 1D and 1E illustrate, in block diagram form, exemplary adaptive charging circuitry in conjunction with a battery/cell (which may include two terminals (for example, positive and negative terminals), according to at least certain aspects of certain embodiments of the present inventions, wherein in this embodiment, the charging circuitry may include a voltage source and/or a current source, and the monitoring circuitry may include voltage and/or current sensors (for example, a voltmeter and/or a current meter); the exemplary embodiments illustrated in FIG. 1E include monitor circuitry which implement one or more Kelvin-type measurement configurations wherein little to no current is employed or required to determine the voltage at the terminals of the battery/cell and/or the current through the battery/cell.
Figure 1E:
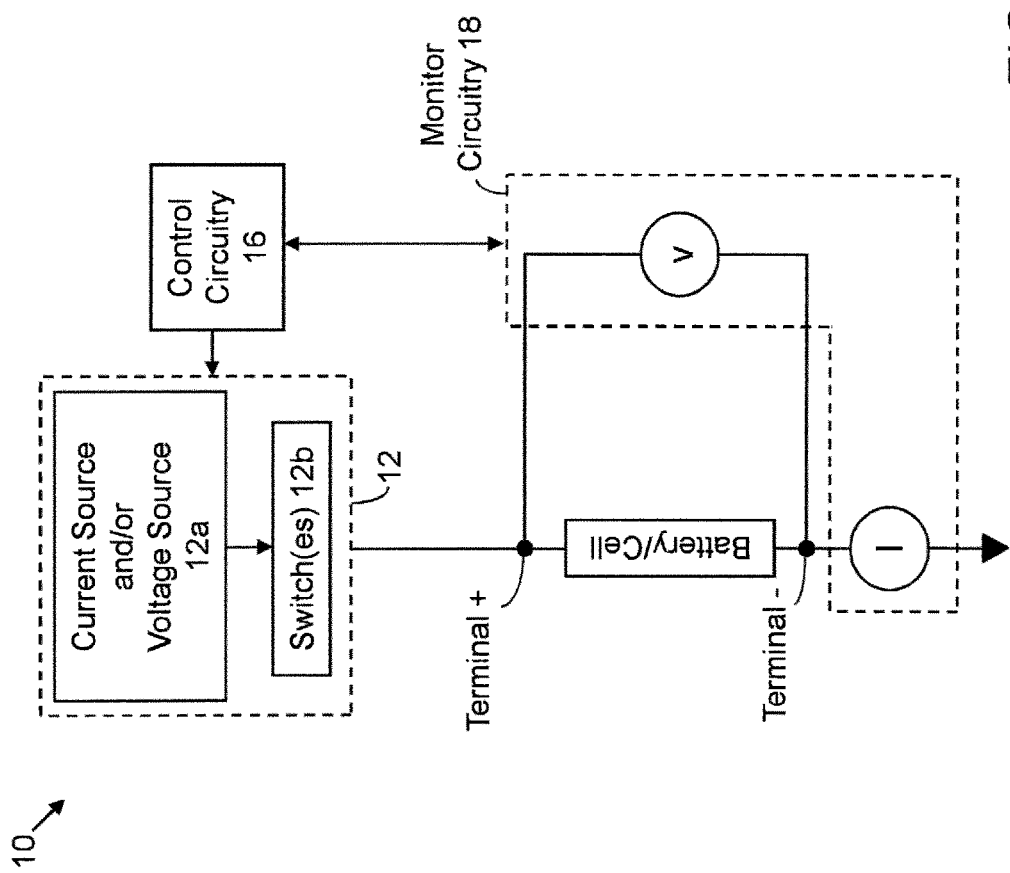
Figure 2A:
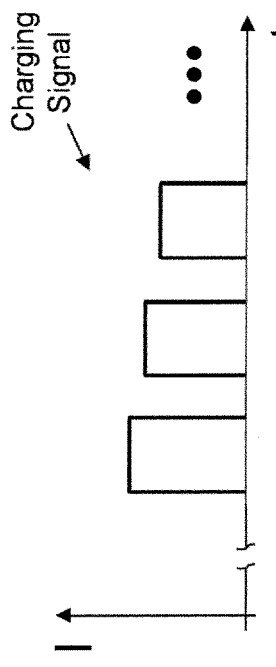
FIGS. 2A-2D illustrate exemplary waveforms illustrating a plurality of exemplary charging signals and discharging signals of an exemplary charging technique, wherein such charging signals may generally decrease according to a predetermined rate and/or pattern (for example, asymptotically, linearly or non-linearly (for example, quadratically)) as the terminal voltage of the battery/cell increases during a charging or recharging sequence, operation or cycle (see, FIGS. 2B and 2D); notably, a charging or recharging sequence, operation or cycle may include charging signals (which, in total, inject or apply charge into the battery/cell) and discharging signals (which, in total, remove charge from the battery/cell); moreover, a pulse charging sequence or operation may include a constant voltage (CV) phase after a period of pulse charging and/or upon charging the battery/cell to a predetermined state of charge.
Figure 2B:
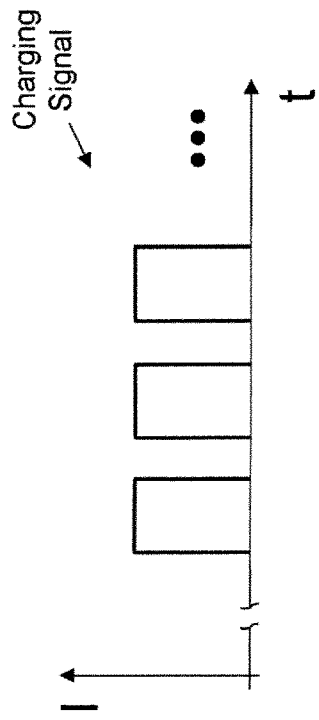
Figure 2C:
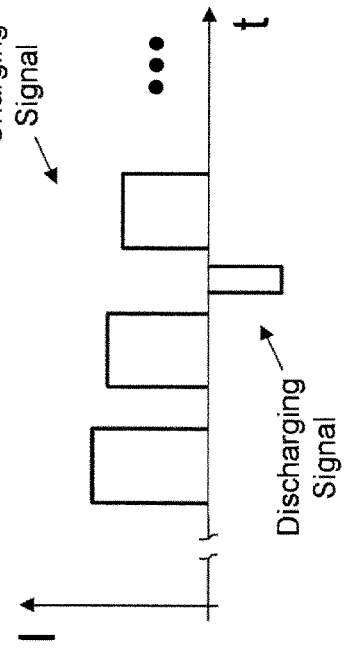
Figure 2D:
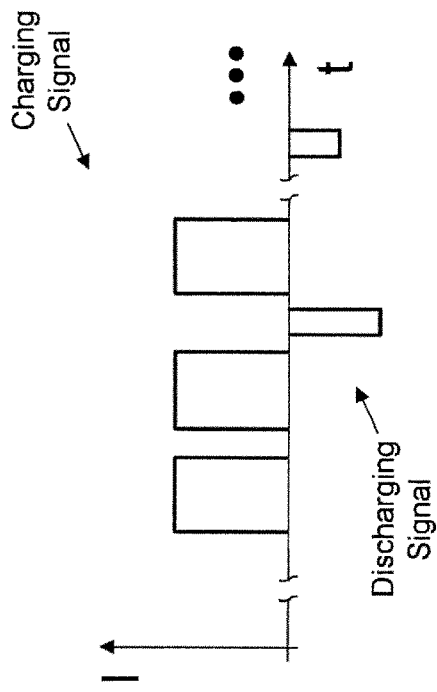
Figure 3P:
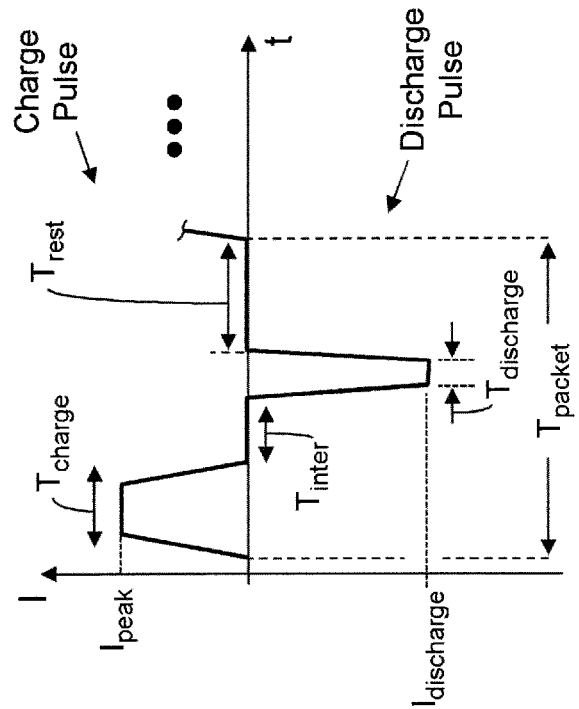
FIG. 3P illustrates an exemplary charge packet having a charge pulse (which injects charge into the battery/cell) and a discharge pulse (which removes charge from the battery/cell) wherein the charge pulse includes a charging period ($T_{charge}$) and the discharge pulse includes a discharging period ($T_{discharge}$), according to certain aspects of the present inventions; notably, in this exemplary charge packet, an intermediate rest period ($T_{inter}$) is disposed between the charge and discharge pulses, and a rest period ($T_{rest}$) is disposed after the discharge pulse and before the next packet; notably, one, some or all of the characteristics of the charge pulses (for example, pulse amplitude, pulse width/duration and pulse shape) are programmable and/or controllable via charging circuitry wherein the amplitude of the positive and/or negative pulses may vary within the packet (and are programmable and/or controllable), the duration and/or timing of the rest periods may vary within the packet (and are programmable and/or controllable) and/or, in addition, such pulses may be equally or unequally spaced within the packet; the combination of charging pulses, discharging pulses and rest periods may be repetitive and thereby forms a packet that may be repeated; all combination or permutations of pulse, pulse characteristics, periods, packets and signal characteristics and configurations are intended to fall within the scope of the present inventions; moreover, discharge packets may have similar characteristics as charge packets except, however, a net charge is removed from the battery/cell; for the sake of brevity, the discussion/illustration with respect to discharge packet will not be repeated.
Figure 3O:
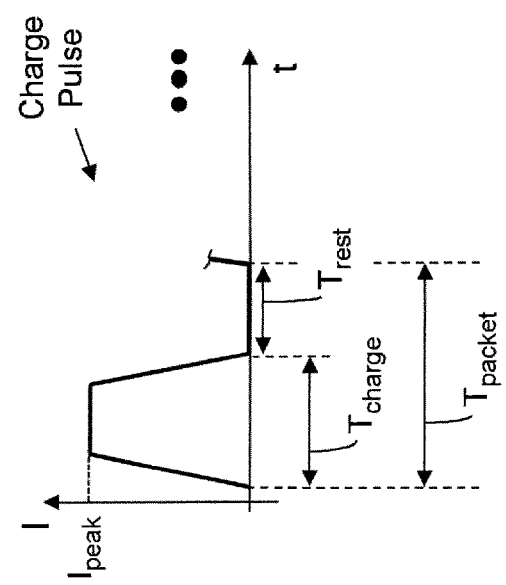
FIG. 3O illustrates an exemplary charge packet having a charge pulse including a charging period ($T_{charge}$) followed by a rest period ($T_{rest}$) wherein the period of the charge packet is identified as $T_{packet}$, according to certain aspects of the present inventions.

Again, there are many inventions described and illustrated herein. The present inventions are neither limited to any single aspect nor embodiment thereof, nor to any combinations and/or permutations of such aspects and/or embodiments. Each of the aspects of the present inventions, and/or embodiments thereof, may be employed alone or in combination with one or more of the other aspects of the present inventions and/or embodiments thereof. For the sake of brevity, many of those combinations and permutations are not discussed separately herein.

DETAILED DESCRIPTION

In one aspect, the present inventions relate to circuitry for and methods of adaptively charging or re-charging (hereinafter collectively "charging") a battery/cell using, among other things, a charge-time parameter (for example, an absolute or relative type charge-time parameter). The charge-time parameter may be characterized as defining, correlating and/or associating a charge time period (during which the battery is undergoing charging by the charging circuitry) to or in relation to (i) a state of charge (SOC) of the battery/cell and/or (ii) a charge storage level corresponding to an amount of usage time of the battery/cell (for example, in relation to a given load (i.e., a given current consumption of, for example, an associated electrical device or a normal operating usage of the battery/cell by an associated device being powered thereby)). For example, in one embodiment, the adaptive charging techniques and/or circuitry uses and/or employs a charge-time parameter, in connection with certain considerations, constraints and/or requirements (that will be described below), to provide a charging sequence of the battery/cell which provides a given SOC of the battery/cell in or within a given amount of time of charging the battery/cell. In another embodiment, the adaptive charging techniques and/or circuitry uses and/or employs a charge-time parameter to implement, adapt, modify and/or change a charge sequence, cycle or operation of the battery/cell to provide (i) a given SOC of the battery/cell in or within a given amount of time of charging the battery/cell and/or (ii) a charge storage level corresponding to an amount of usage time of the battery/cell in or within a given amount of time of charging the battery/cell. (See, e.g., FIGS. 1A-1E).

In the context of a pulse current charging technique (see, e.g., FIGS. 2A-2D and 3A-3P), the circuitry and techniques of the present inventions may implement, provide, change, adjust and/or control one or more characteristics of the charging signal applied to the battery/cell (for example, a shape of charge and/or discharge signal (if any), amplitude thereof, duration thereof, duty cycle thereof, rest period (if any) and/or sequence of charge and/or discharge pulses) to meet, satisfy and/or comply with the charge-time parameter (for example, implement, provide and/or apply a charging sequence which, in or within one or more associated periods of time, the battery/cell includes one or more percentages of a SOC and/or one or more amounts of usage time of the battery/cell). For example, the adaptive charging technique and circuitry may measure or monitor the charging operation (for example, current applied to the battery/cell, terminal voltage of the battery/cell and/or temperature (for example, of the battery, device housing and/or charger circuitry)) and, in response thereto, apply charging current signal(s) to the battery/cell so that a predetermined state of charge and/or a charge storage level corresponding to a predetermined amount of usage time in or within a predetermined amount of time of charging the battery/cell (for example, 50% SOC of the battery/cell in or within 15 minutes of charging the battery/cell and/or 30 minutes of usage of the battery/cell (for example, under normal operating conditions of the associated device) after 15 minutes of charging of the battery/cell (for example, uninterrupted charging via the adaptive charging sequence of the present inventions)). In this way, the circuitry and techniques, based on or using a charge-time parameter, implement, change, adjust and/or control one or more characteristics of the charging operation to meet, satisfy and/or comply with a condition or "goal" defined by, associated with or corresponding to the charge-time parameter.

Figure 4A:
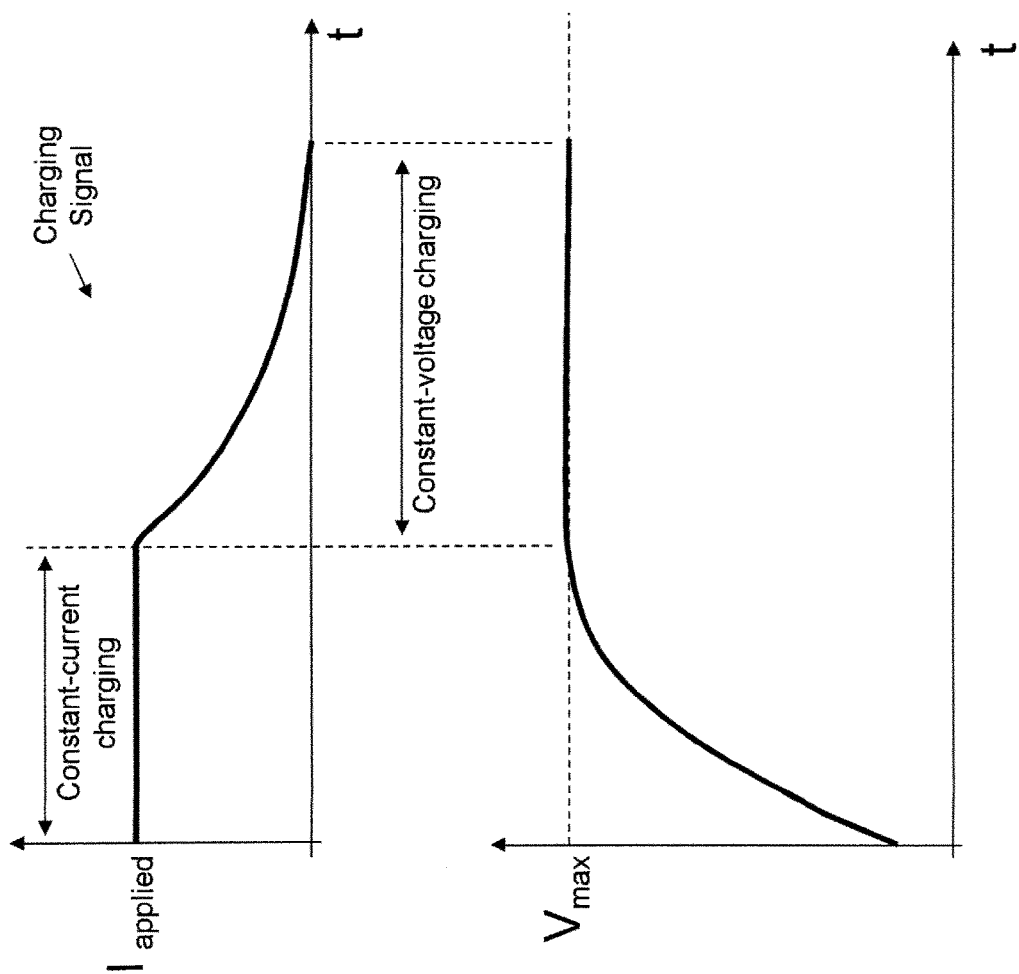
FIG. 4A illustrates current and voltage of a battery/cell as a function of time illustrating the conventional charging method known as constant-current, constant-voltage (CCCV); notably, a conventional method to charge a rechargeable battery, including a lithium-ion type rechargeable battery, employs a CCCV technique, wherein the charging sequence includes a constant-current (CC) charging mode until the terminal voltage of the battery/cell is at about a maximum amplitude (for example, about 4.2V to 4.5V for certain lithium-ion type rechargeable batteries) at which point the charging sequence changes from the constant-current charging mode to a constant-voltage (CV) charging mode, wherein in the CV mode, a constant voltage is applied to the terminals of the battery/cell; in the CCCV technique, the charging circuitry often changes from the CC charging mode to the CV charging mode when the state of charge (SOC) of the battery/cell is at about 50-80%, depending on the applied current (notably, at higher currents, the transition to CV may be less than 50% SOC.
Figure 4B:
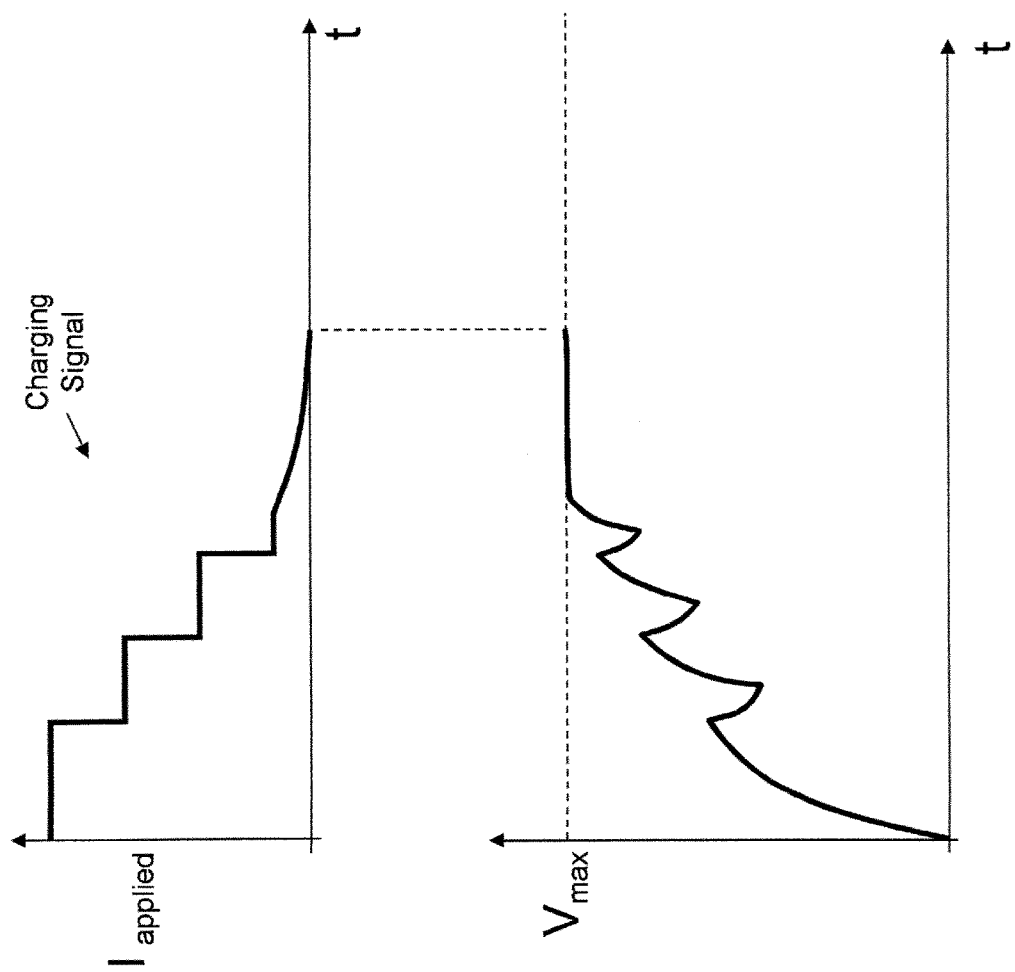
FIG. 4B illustrates current and voltage of a battery/cell as a function of time illustrating a charging method known as step-charging; notably, a method to step-charging a rechargeable battery, including a lithium-ion type rechargeable battery, employs a multiple step charging mode until the terminal voltage of the battery/cell is at about a maximum amplitude (for example, about 4.2V to 4.5V for certain lithium-ion type rechargeable batteries) at which point the charging sequence changes from the constant-current charging mode to a constant-voltage (CV) charging mode, wherein in the CV mode, a constant voltage is applied to the terminals of the battery/cell.
Figure 5A:
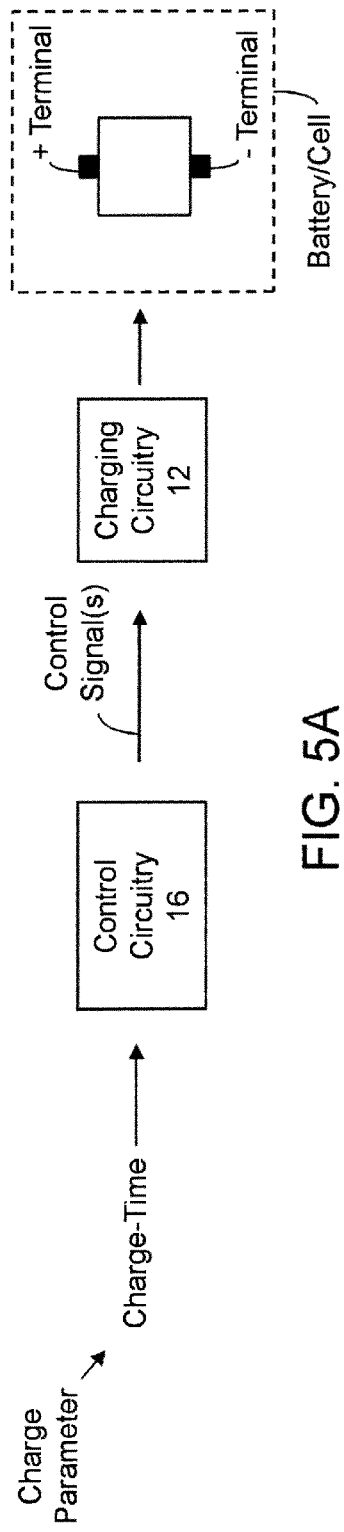
FIGS. 5A-5D illustrate block diagram representations of exemplary adaptive charging circuitry in conjunction with a battery/cell, according to at least certain aspects of certain embodiments of the present inventions, wherein the control circuitry may employ a charge-time parameter to generate control signals which are employed to control, adapt, modify and/or implement one or more characteristics of the charge or current applied to or injected into the battery/cell so that the charging sequence, operation or cycle meets, satisfies and/or complies with the charge-time parameter; in one embodiment, the control circuitry may employ a charge-time parameter and one or more of current parameter(s), voltage parameter(s) and/or temperature parameter(s) (see, FIG. 5B); and, in another embodiment, the control circuitry may employ a charge-time parameter and one or more of current parameter(s), voltage parameter(s) SOC of the battery/cell, SOH of the battery/cell and/or temperature parameter(s) (see, FIG. 5C); and, in another embodiment, the control circuitry may employ a charge-time parameter and one or more of current parameter(s), voltage parameter(s) SOC of the battery/cell, $Q_{max}$ of the battery/cell, SOH of the battery/cell and/or temperature parameter(s) (see, FIG. 5D); notably, the control circuitry may also receive current, voltage and temperature data (for example, feedback data) from the monitoring circuitry (not illustrated) and, in response thereto, evaluate, analyze and/or determine the conditions of the battery and/or charging circuitry during the charge sequence, cycle or operation of the battery/cell.
Figure 5B:
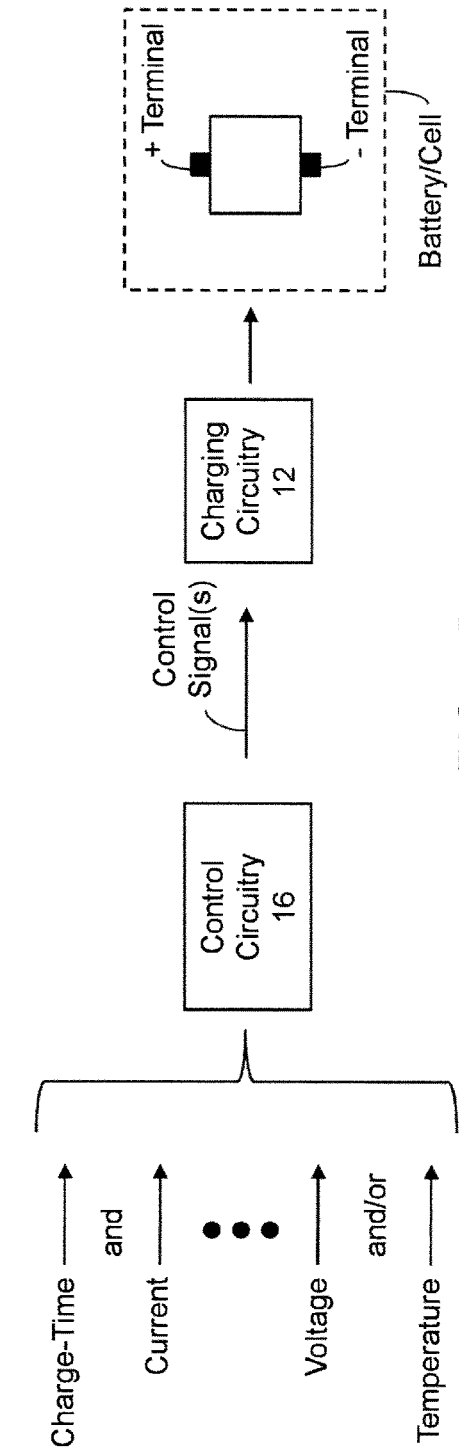
Figure 5C:
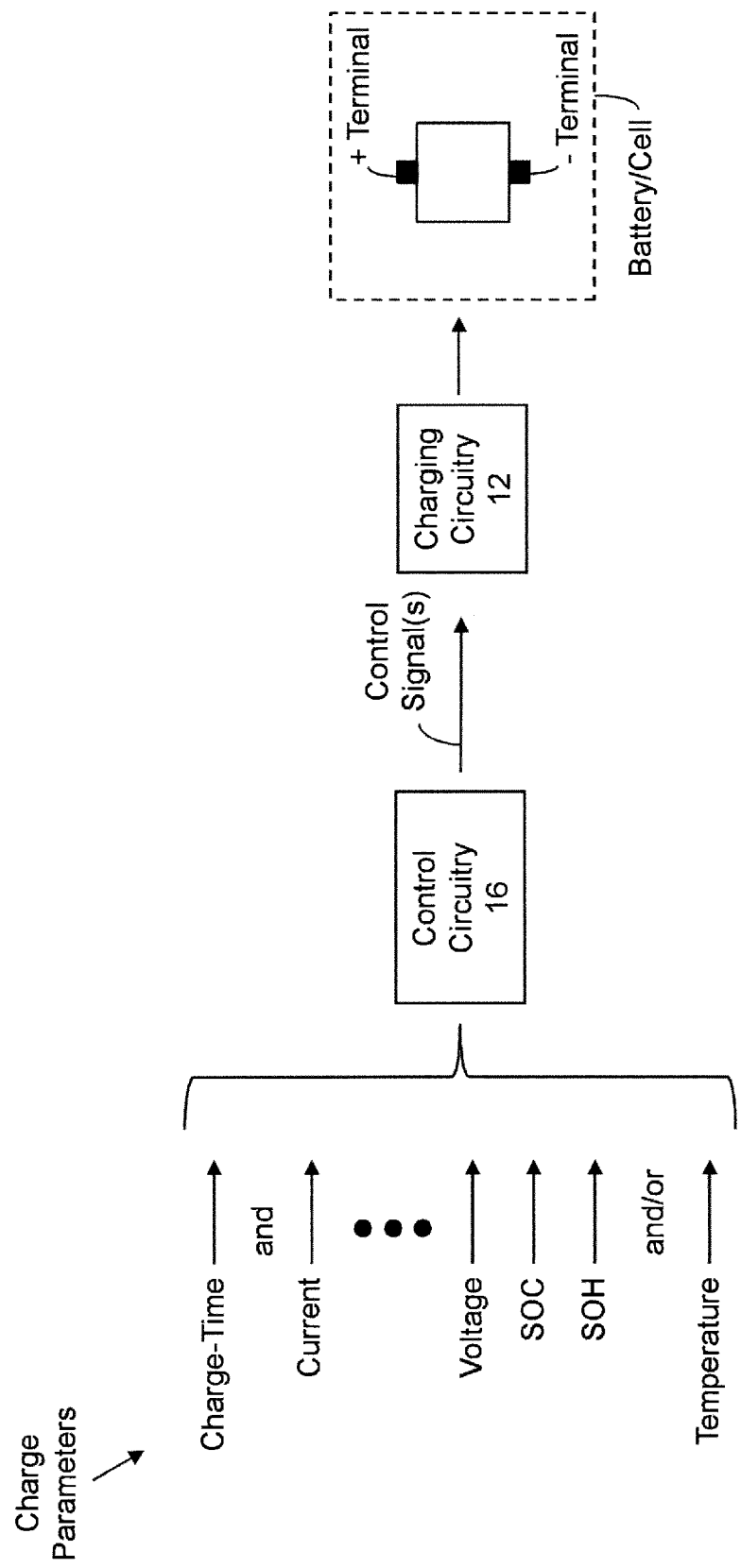
Figure 5D:
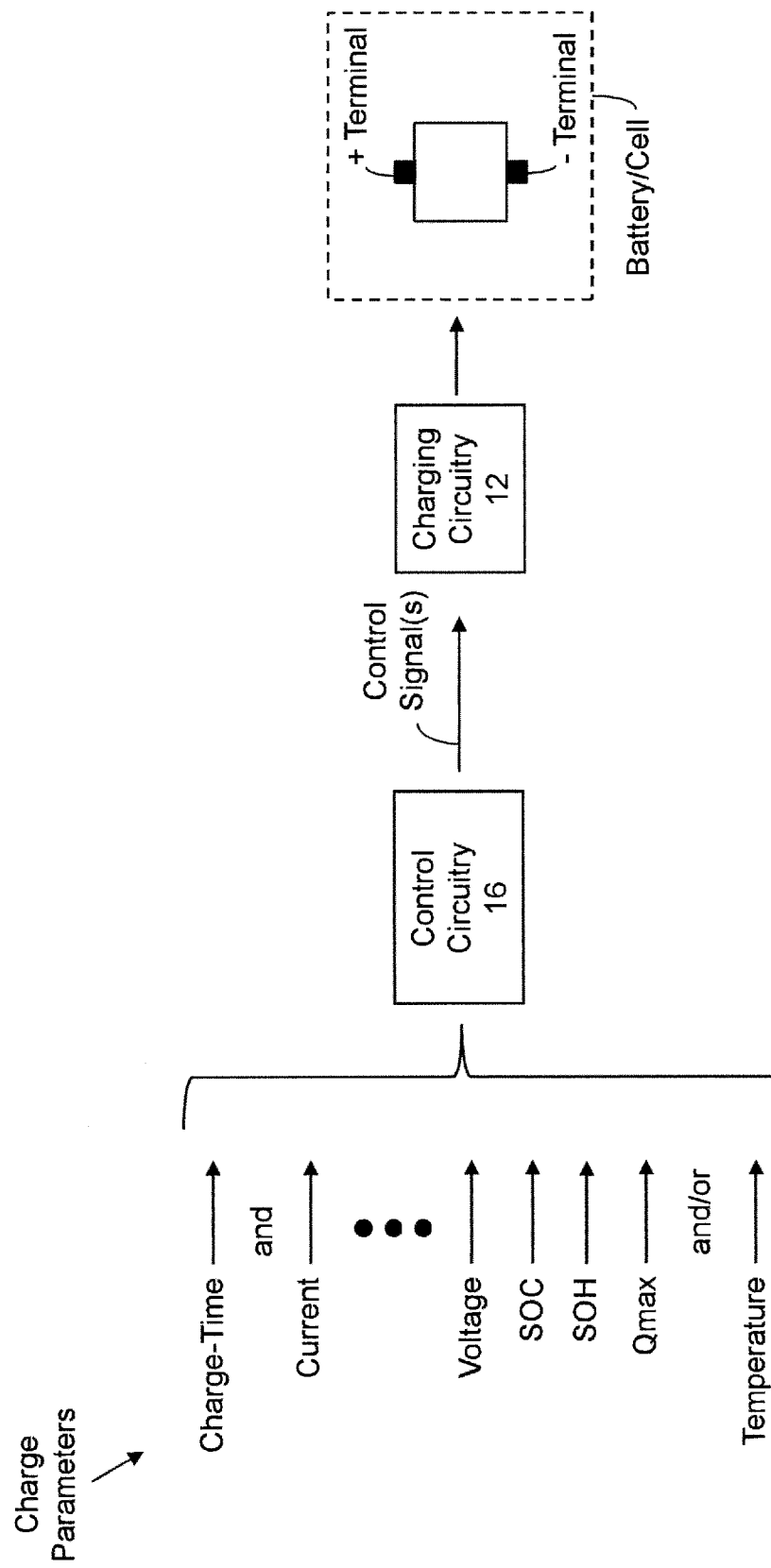
Figure 6A:
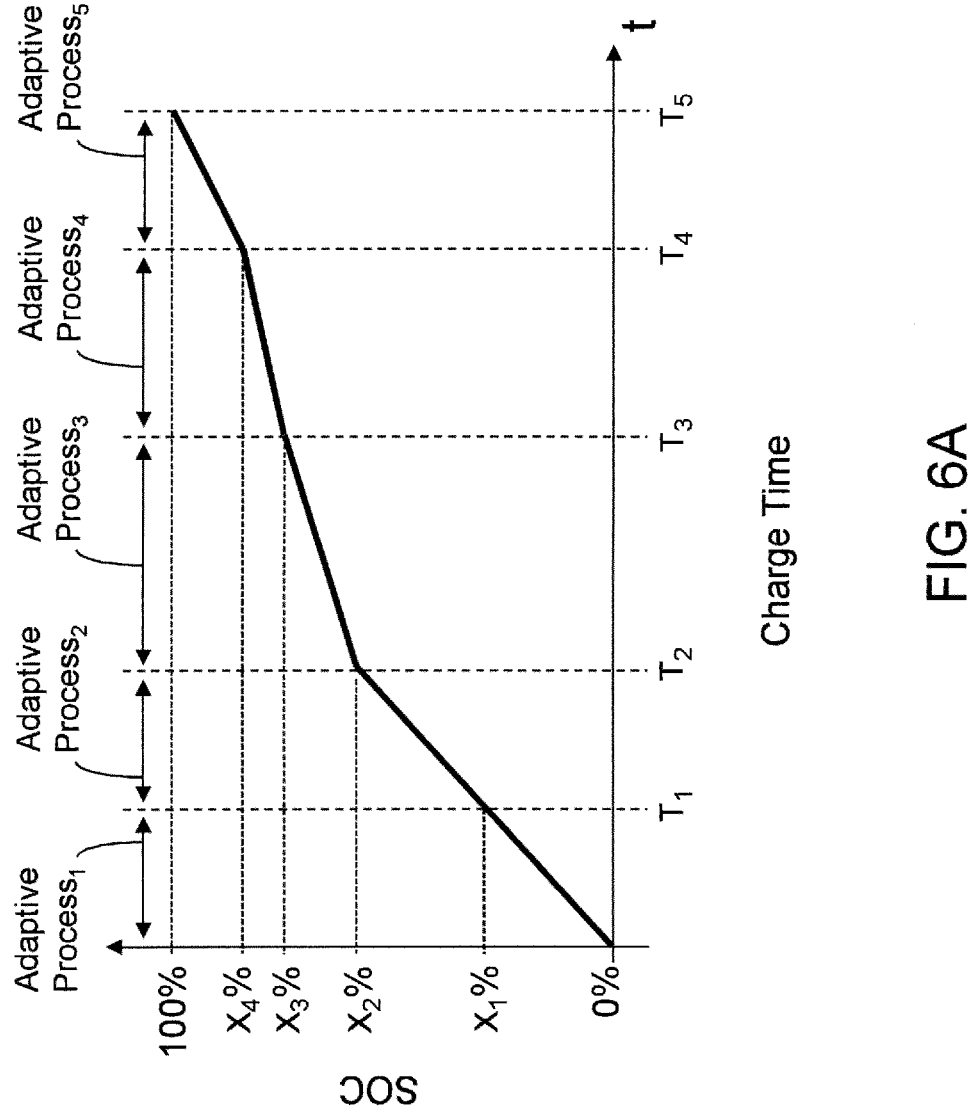
FIG. 6A-6E are graphical illustrations of the charge time of the battery/cell versus an SOC of the battery/cell wherein the entire adaptive charging technique include a plurality of adaptive charging processes such that each adaptive charging process includes an associated charge-time parameter and is associated with a zone or range of SOC of the battery/cell; each adaptive charging process, in operation, may generate, cause and/or provide a linear increase in SOC or non-linear increase in SOC over the range of SOC in which the process is implemented (for example, Adaptive Process$_1$ in FIGS. 6A-6E generates, causes and/or provides a linear increase in the SOC over $X_1$% whereas Adaptive Process$_3$ in FIGS. 6B-6D generates, causes and/or provides a non-linear increase in the SOC between $X_2$ to $X_3$%)
Figure 6B:
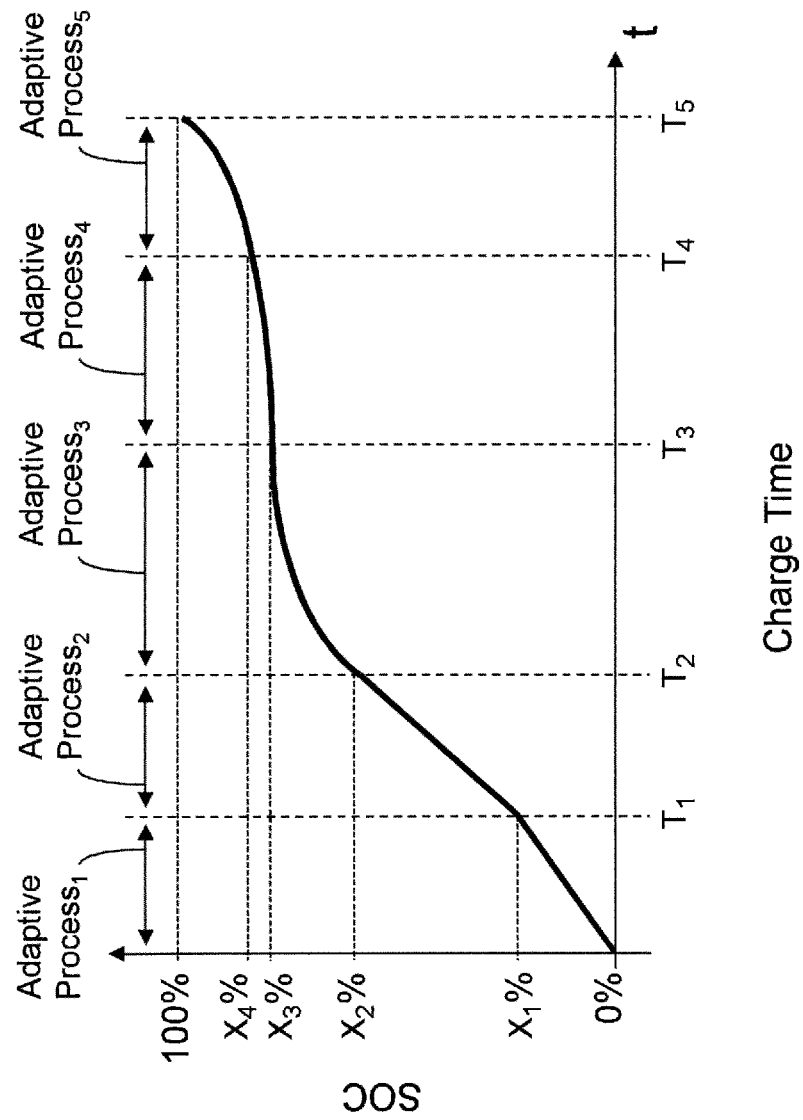
Figure 6C:
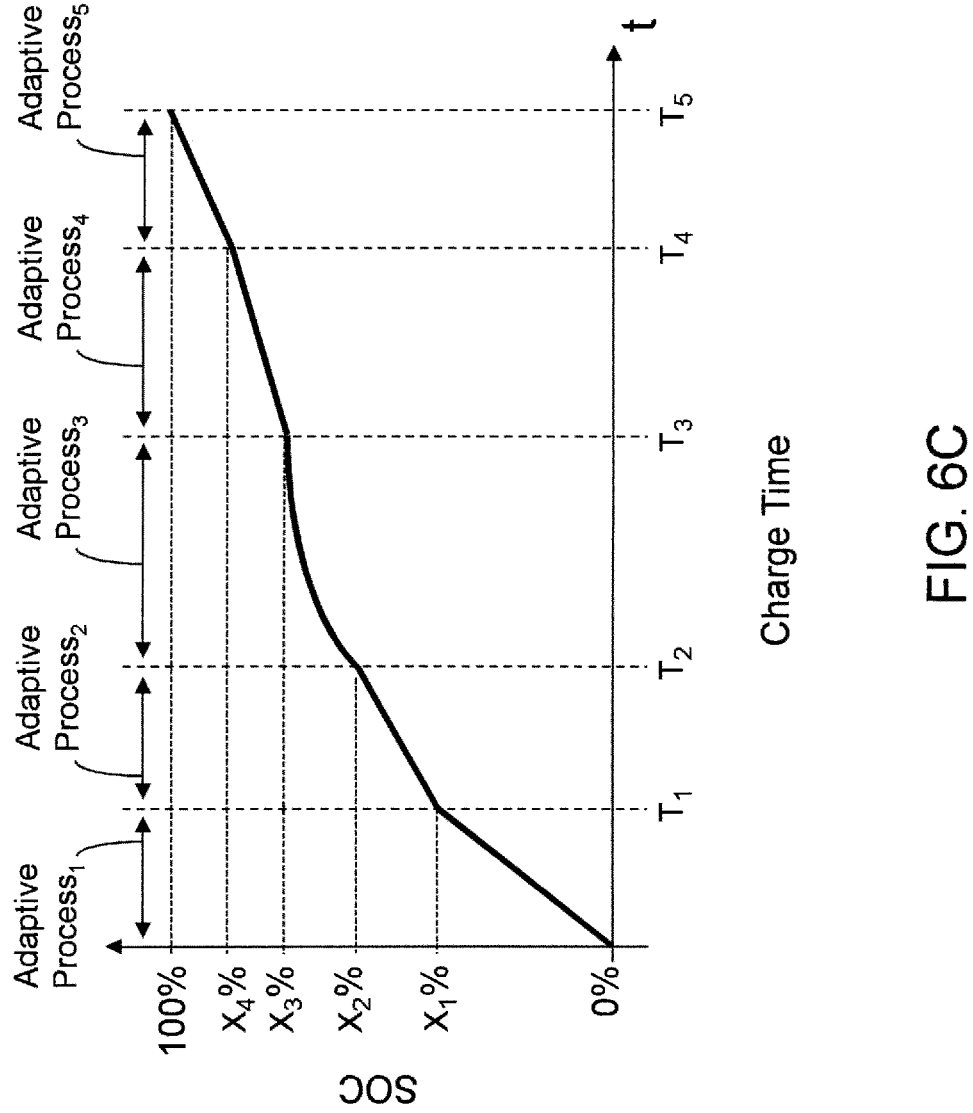
Figure 6D:
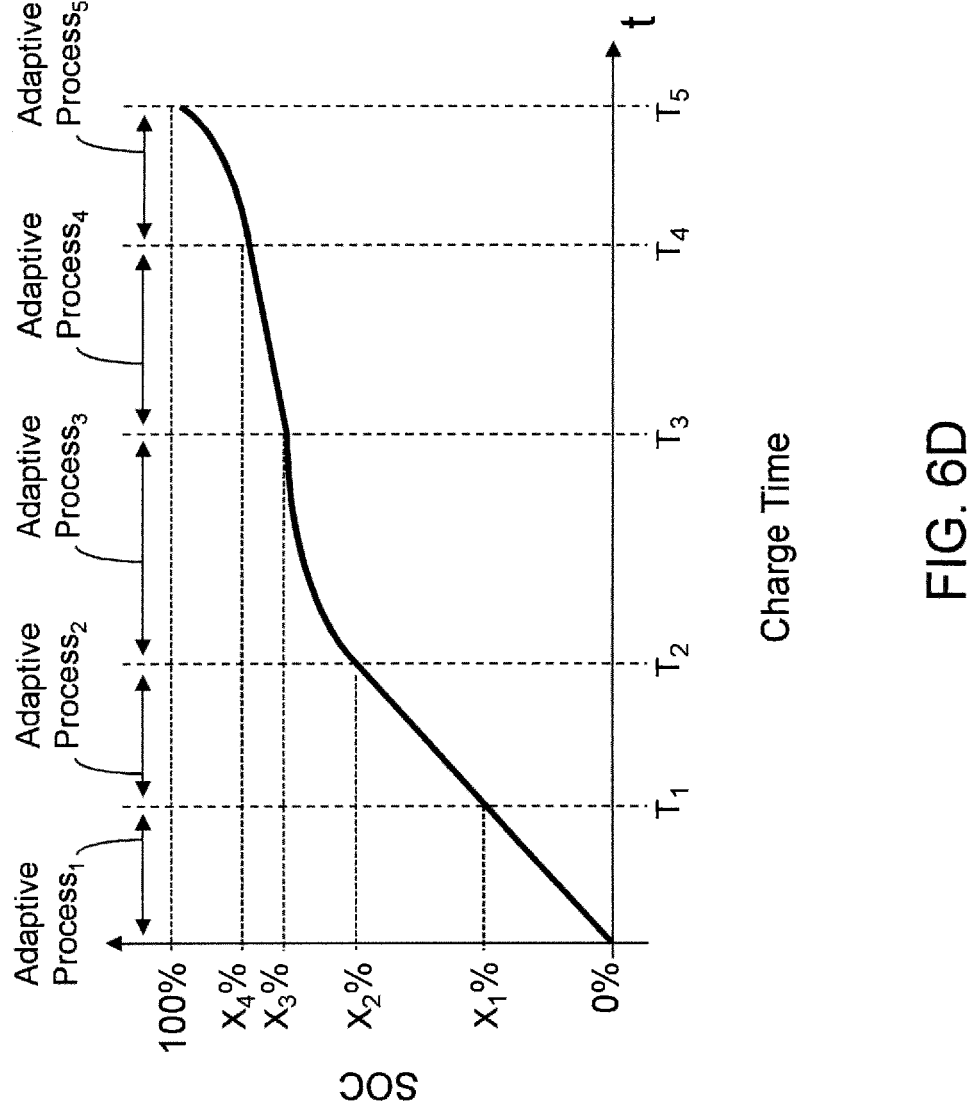
Figure 6E:
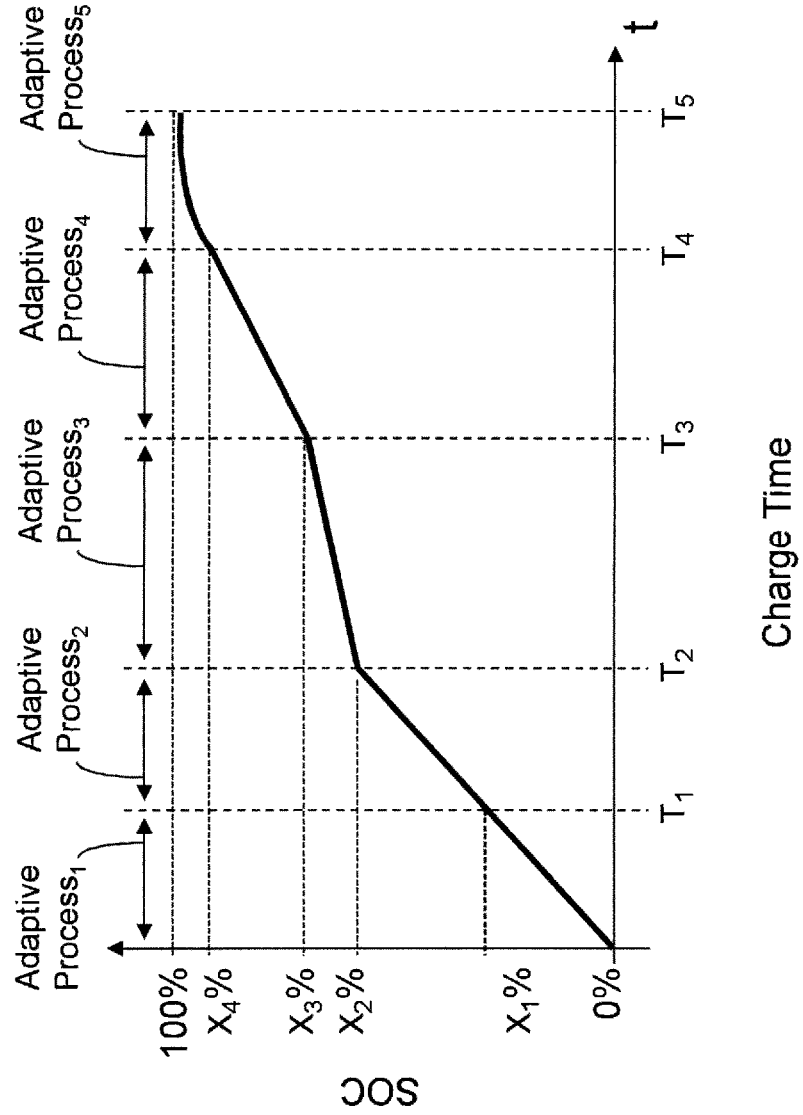
Figure 7:
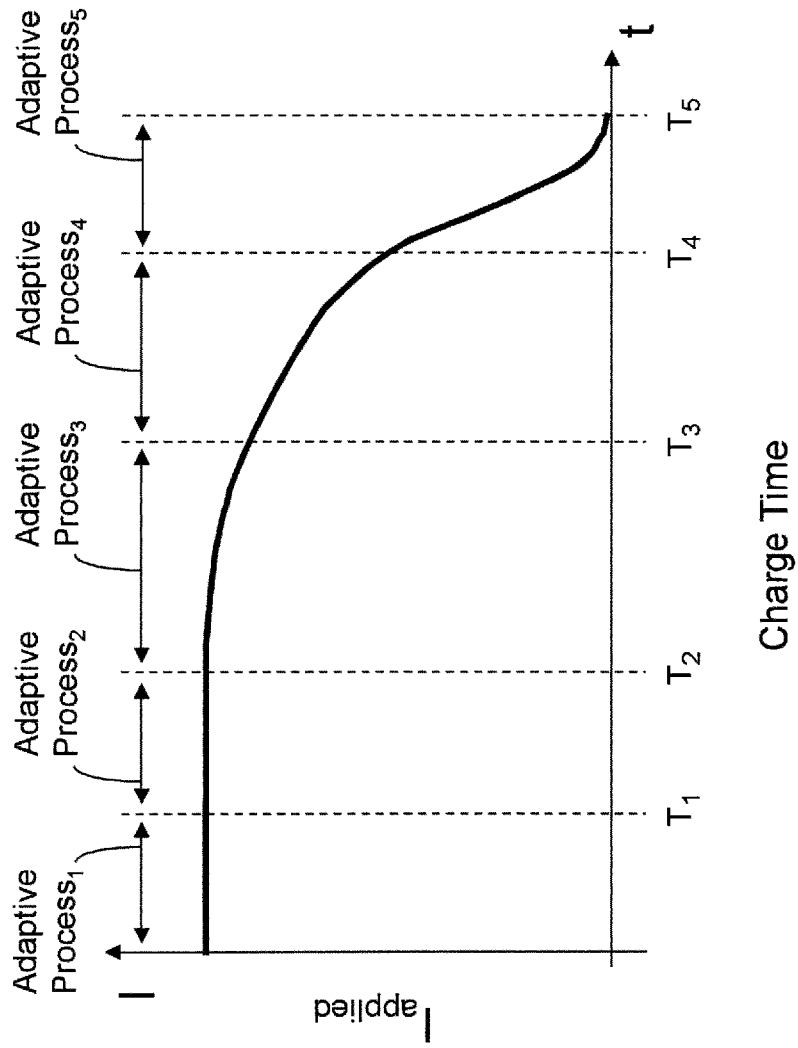
FIG. 7 is a graphical illustration of the charge time of the battery/cell versus an amount of current applied to the battery/cell over a plurality of zones or ranges of SOC of the battery/cell in which each adaptive charging process includes an associated charge-time parameter which, in combination, provides a charge sequence, cycle or operation of the battery/cell.
Figure 8B:
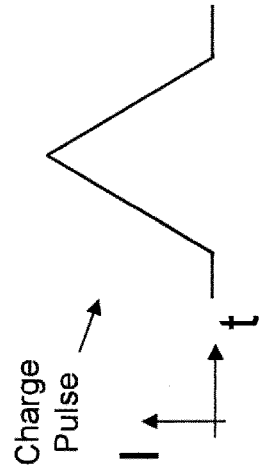
FIGS. 8A-8D illustrate exemplary charge pulses having different shapes and pulse widths; all combinations or permutations of charge pulse characteristics are intended to fall within the scope of the present inventions.
Figure 8D:
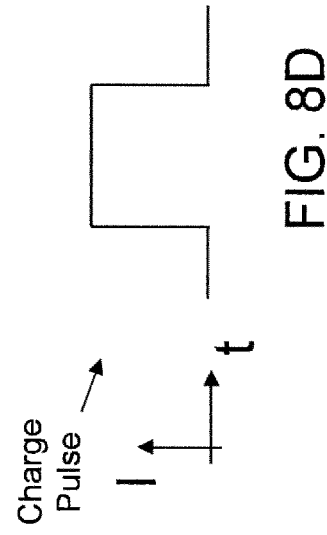
Figure 8A:
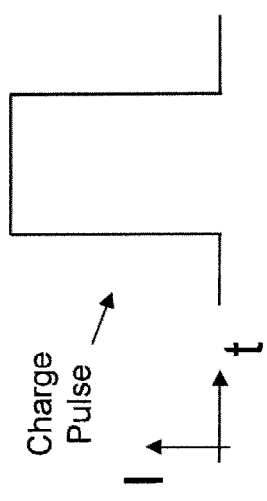
Figure 8C:
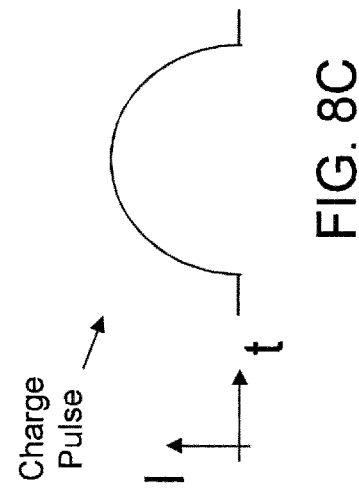
Figure 9B:
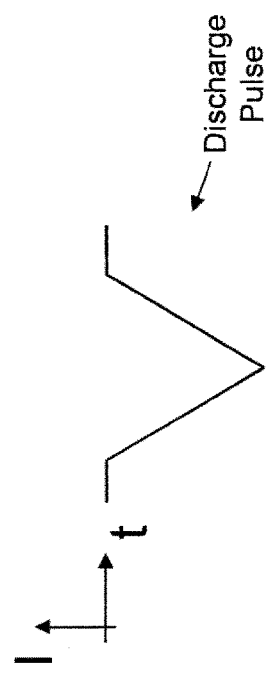
FIGS. 9A-9D illustrate exemplary discharge pulses having different shapes and pulse widths; all combinations or permutations of discharge pulse characteristics are intended to fall within the scope of the present inventions.
Figure 9D:
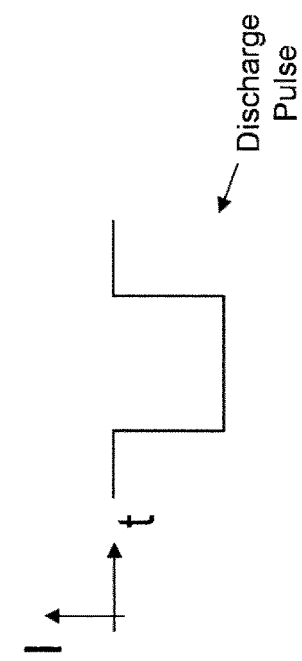
Figure 9A:
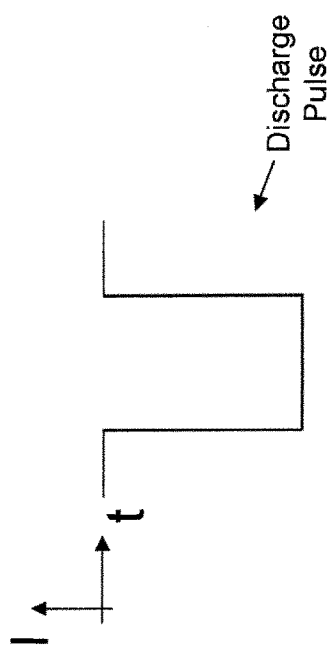
Figure 9C:
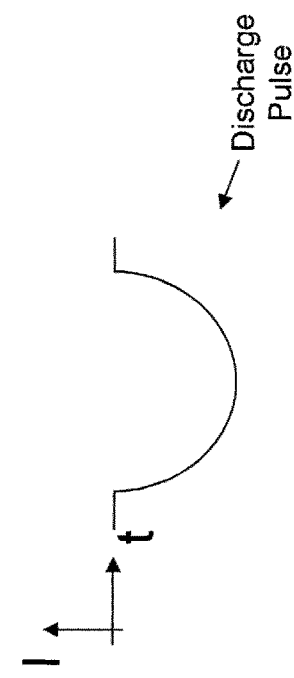

Similarly, in the context of a constant-current, constant-voltage technique ("CCCV") charging technique and/or a step charging technique (see, e.g., FIGS. 4A and 4B), the circuitry and techniques of the present inventions may implement and/or adapt the charging operation, in accordance with the charge-time parameter to implement, determine, change, adjust, control and/or vary an amplitude of the charging current applied to and/or voltage of the battery/cell during the charging operation so that the battery/cell contains or includes a particular SOC in or within a particular amount of time of charging the battery/cell. In this way, the circuitry implements, determines, changes, adjusts and/or controls one or more characteristics of the charging signal applied to the battery/cell during the charging operation based on or using a charge-time parameter to meet, satisfy and/or comply with a condition or "goal" defined by, associated with or corresponding to the charge-time parameter.

Notably, the SOC of a battery/cell, for example, a lithium-ion rechargeable battery/cell, is a parameter that is representative and/or indicates the level of electrical charge available in the battery/cell. It may be characterized as a percentage of the nominal full charge rating of the battery/cell, wherein a 100% SOC indicates that a battery/cell is fully charged and a 0% indicates that the battery/cell is fully discharged. The SOC of the battery/cell may also be characterized as an available charge stored in the battery/cell relative to a maximum available charge stored in the battery/cell—wherein the maximum available charge may change over time as, for example, the battery/cell ages or deteriorates.

In one embodiment, the adaptive charging techniques and/or circuitry of the present inventions may determine, implement and/or adapt a charging sequence of the battery/cell according to, among other things, one or more charge-time parameters. (See, e.g., FIGS. 5A-5D, 6A-6E and 7). The charge-time parameters may be associated with a given zone or range of SOC of the battery/cell. For example, a first range of SOC of the battery may be associated with a first charge-time parameter (for example, a first charge-time parameter is associated with 0-50% of SOC), a second range of SOC may be associated with a second charge-time parameter (for example, a second charge-time parameter is associated with 50-80%), a third range of SOC may be associated with a third charge-time parameter (for example, a third charge-time parameter is associated with 80-90%), and so on (see, e.g., FIGS. 6A-6E and 7). Here, the circuitry and techniques in one embodiment of the present inventions, based on or using the appropriate charge-time parameter, may implement, change, adjust and/or control one or more characteristics of the charging operation (whereby each SOC zone or range includes an associated adaptive process) to meet, satisfy and/or comply with a condition or "goal" defined by or corresponding to the charge-time parameter of the associated zone or range of SOC of the battery/cell.

The adaptive charging techniques and/or circuitry of the present inventions may employ a charge-time parameter for only a portion of the overall charging process and/or one or more portions of the charging process may employ an associated charge-time parameter and one or more portions of the charging process may not employ a charge-time parameter. For example, the charging process may include only one SOC zone in which to employ a charge-time parameter (for example, charge-time parameter is associated with 0-50% of SOC of the battery/cell)—wherein the adaptive charging techniques and/or circuitry of the present inventions may determine, implement and/or adapt the charging sequence of the battery/cell to attain and/or provide a predetermined SOC (in this example, 50%) within a predetermined amount of time (for example, 20 minutes of charging). In this embodiment, the adaptive charging techniques and/or circuitry does not employ a charge-time parameter (for example, 50%-100% SOC of the battery/cell) in connection with that "remaining" portion of the charging process but may employ any other charging technique now known or later developed including, for example, considerations in connection with implementing charging techniques to (i) minimize and/or reduce total charging time of the battery/cell and (ii) maximize and/or increase cycle life of the battery/cell. Here, the adaptive charging circuitry and techniques, in connection with a portion (which may be any portion of the sequence, for example, an initial or middle portion of the charging sequence) and/or "remaining" portion of the charging process which does not employ a charge-time parameter, may implement adaptive techniques which seek to (i) minimize and/or reduce total charging time of the battery/cell and (ii) maximize and/or increase the cycle life of the battery/cell (by, for example, minimizing and/or reducing degradation mechanisms of the charging operation). Indeed, with respect to a portion and/or "remaining" portion of the charging process which does not employ a charge-time parameter, the adaptive charging circuitry and techniques may employ one or more (or all) of the charging processes described and/or illustrated in the non-provisional patent applications that are expressly incorporated by reference herein (i.e., U.S. patent application Ser. Nos. 13/366, 352, 13/626,605, 13/657,841, 13/747,914 and/or 13/836, 235).

Notably, in one embodiment, the amount of time allotted to charge the battery/cell to a predetermined SOC or within a predetermined SOC range or zone of the battery/cell may be adjusted, compensated or prorated according to the SOC of the battery/cell at the start of the charging sequence. That is, based on the SOC of the battery at the start of the charging sequence (i.e., an initial SOC), the adaptive charging techniques and/or circuitry of the present inventions may determine, implement and/or adapt the charging sequence of the battery/cell to attain or provide a predetermined or particular SOC within a first amount of time which is compensated or prorated according to the initial SOC of the battery/cell. For example, where the initial SOC of the battery/cell is 20%, and the predetermined SOC range or zone of the charge-time parameter is 0-50%, and the predetermined amount of time of the charge-time parameter is 20 minutes of charging, the adaptive charging techniques and/or circuitry of the present inventions may determine, implement and/or adapt the charging sequence of the battery/cell to attain or provide an SOC of 50% within 12 minutes (in the event that the compensation or proration is linear).

Indeed, the compensation or proration may correlate to the anticipated or predetermined relationship between (a) the SOC increase over time within the particular zone of the SOC and (b) an amount of time the battery is under charge (for example, "curve fit" to the charge relationship of the battery/cell such as a linear or non-linear (for example quadratic) compensation/proration where the charging operation provides or the battery/cell charge exhibits a linear or non-linear relationship, respectively, of SOC of the battery/cell to the charge time of the battery/cell).

Similarly, under the circumstance that the charge-time parameter corresponds to an amount of usage time of the battery/cell in or within a given amount of time of charging the battery/cell, the amount of time allotted to charge the battery/cell to a state whereby the battery/cell provides a predetermined or desired amount of usage time of the battery/cell may also be adjusted, compensated or prorated according to the initial amount of usage time of the battery/ cell at the start of the charging sequence. Here, based on the initial amount of usage time of the battery/cell at the start of the charging sequence, the control circuitry and techniques of the present invention determine, implement and/or adapt the charging sequence of the battery/cell to attain or provide a predetermined or desired amount of usage time of the battery/cell within a pro rata amount of time. As stated above, the compensation or proration may correlate to an anticipated or predetermined relationship between (a) an amount of usage time of the battery/cell and (b) an amount of time the battery is under charge (for example, a linear or non-linear (for example, quadratic) compensation/proration where the charging operation provides or the battery/cell charge exhibits a linear or non-linear relationship, respectively, of amount of usage of the battery/cell to the charge time of the battery/cell).

As intimated above, the charging techniques and/or circuitry of the present inventions may use and/or employ a charge-time parameter alone or in connection with or based on one or more certain constraints or requirements, for example, operating conditions of the battery/cell, to charge a battery/cell. (See, e.g., FIGS. 5A-5D). In one embodiment, the adaptive charging techniques and/or circuitry may implement, determine and/or adjust boundary conditions of information/data based on or using a charge-time parameter, for example, an overpotential (OP) or full relaxation time (FRT) of the battery/cell, a charge pulse voltage (CPV) or a change in CPV, a partial relaxation time (PRT) of the battery/cell, a temperature of the battery/cell ($T°_{b/c}$), a temperature of the charging circuitry ($T°_{cc}$), a temperature of the housing ($T°_h$), a maximum current applied to the battery/ cell during charging operations ($I_{max}$) and/or a maximum terminal voltage during charging operations ($V_{max}$). The control circuitry may employ one or more such measures, in relation to boundary conditions relating thereto, during the charging processes to determine whether to implement, adapt, modify and/or change a charge sequence, cycle or operation of the battery/cell. For example, the control circuitry may receive data which is representative of the current applied to the battery/cell, one or more terminal voltages of the battery/cell, an amount of current applied to the battery/cell, and/or one or more temperatures (for example, of the battery, device housing and/or charger circuitry) and, based thereon, may determine, estimate and/or calculate OP, CPV, PRT, $T°_{b/c}$, $T°_{cc}$, $T°_h$, $I_{max}$ and/or $V_{max}$. (See, e.g., FIGS. 5B and 5C). Using boundary conditions, the control circuitry and techniques determine or assess whether one or more of OP, CPV, PRT, $T°_{b/c}$, $T°_{cc}$, $T°_h$, $I_{max}$ and/or $V_{max}$ are out-of-specification (for example, a measure or operating condition is outside of a predetermined range or greater than a upper limit) and, based thereon, determine whether and/or how to implement, adapt, modify and/or change a charge sequence, cycle or operation of the battery/cell to bring such out-of-specification measure to in-specification.

As such, in one embodiment, the charge-time parameter (for example, charging the battery/cell in such a manner that a given SOC of the battery/cell in or within a given amount of time of charging the battery/cell) is employed to implement, determine and/or modify one, some or all boundary conditions of OP, CPV, PRT, $T°_{b/c}$, $T°_{cc}$, $T°_h$, $I_{max}$ and/or $V_{max}$ which the control circuitry may employ during the charging processes to determine whether and how to implement, adapt, modify and/or change a charge sequence, cycle or operation of the battery/cell. In this way, the control circuitry monitors one or more measures of the battery conditions and/or operating considerations (for example, OP, CPV, PRT, $T°_{b/c}$, $T°_h$, $I_{max}$ and/or $V_{max}$, and/or pulse width of the current or voltage signals (for example, of a pulse or step charging sequence) in order to, if necessary, implement, adapt, modify and/or change a charge sequence, cycle or operation of the battery/cell as well as in order to meet, satisfy and/or comply with a condition or "goal" defined by or corresponding to the charge-time parameter. (See, e.g., FIGS. 5B and 5C, 6A-6E and 7).

For example, as discussed in U.S. patent application Ser. No. 13/626,605, control circuitry adapts, adjusts and/or controls characteristics of the charge or discharge signal, packet and/or pulse (via controlling, for example, the shape, amplitude and/or duration of the signal output of the charging circuitry) based on whether the CPV and/or a change in CPV of the battery/cell is within specification (i.e., in the predetermined range, less than the predetermined upper limit value and/or greater than the predetermined lower limit value). In one embodiment of these inventions, that range, upper limit and/or lower limit is determined, adjusted and/or modified in accordance with, based on or using a charge-time parameter. For example, a predetermined upper limit value may increase thereby allowing a higher CPV of the battery/cell (in response to the charging signal) before the control circuitry (and techniques implemented thereby) adapts, adjusts and/or controls characteristics of the charge or discharge signal, packet and/or pulse (via controlling, for example, the shape, sequence of charge and/or discharge pulses, amplitude and/or duration of the signal output of the charging circuitry). In this way, the boundary condition(s) of CPV and/or change in CPV of the battery/cell in response to a charge pulse of a charge or discharge signal and/or packet is/are determined, adjusted and/or modified to meet, satisfy and/or comply with a condition or "goal" defined by or corresponding to the charge-time parameter.

Notably, the OP of the battery/cell may be characterized as the voltage difference between the terminal voltage of the battery/cell at the initiation of the charge signal and the terminal voltage of the battery/cell when the battery/cell is at full equilibrium (which may be characterized as when the terminal voltage of the battery/cell is substantially or relatively constant or unchanging under no charging current—which, for a conventional lithium ion battery/cell, is typically after a temporal duration of, for example, 1 to 1,000 seconds). (See, e.g., U.S. patent application Ser. No. 13/366,352, which is incorporated herein by reference). Further, the CPV may be characterized as (i) a peak voltage, measured at the terminals of the battery/cell, which is in response to a charge pulse and/or (ii) a substantial peak voltage (i.e., within 5-10% of the peak voltage), measured at the terminals of the battery/cell, which is in response to a charge pulse. (See, e.g., U.S. patent application Ser. No. 13/626,605, which is incorporated herein by reference). The PRT of the battery/cell may be characterized as the amount of time between after application of a charge pulse to the battery/cell (for example, a discharge pulse) and when the voltage of the battery/cell (measured at the terminals thereof) is at a predetermined value (for example, preferably less than 10% of peak deviation and, more preferably, less than 5% of peak deviation). (See, e.g., U.S. patent application Ser. No. 13/111,902, which is incorporated herein by reference).

The one or more charge-time parameter(s) may be fixed or programmable (whether one time or multiple times), for example, during use (in situ) and/or based on one or more operating conditions. Moreover, use of the charge-time parameter(s) in the charging process may be fixed and/or programmable after manufacture, deployment and/or during operation (for example, in situ by a user and/or operator of the electronic device associated with the control circuitry). In one exemplary embodiment, a user and/or operator may "enable" and/or "disable" a charge-time parameter (for example, charging the battery/cell in such a manner that a given SOC of the battery/cell in or within a given amount of time of charging the battery/cell). Where the system includes a plurality of charge-time parameters, the user and/or operator may "enable" and/or "disable" one or more (or all) charge-time parameters. In one embodiment, if a charge-time parameter is disabled, the charging techniques and/or circuitry may implement any charging techniques or process in now known or later developed including, for example, implementing a different predetermined charging technique (for example, CCCV, step charging or pulse charging) and/or charging techniques to (i) minimize and/or reduce total charging time of the battery/cell and (ii) maximize and/or increase cycle life of the battery/cell. For example, in response to disabling a charge-time parameter, the charging techniques and/or circuitry may determine and/or adjust one or more boundary conditions of information/data accordingly (for example, determine and/or modify boundary conditions of OP, CPV, PRT, $T°_{b/c}$, $T°_{cc}$, $T°_h$, $I_{max}$ and/or $V_{max}$, and/or pulse width of the current or voltage signals (for example, of a pulse or step charging sequence)) of the charging signal or sequence. In another embodiment, where the charge-time parameter is enabled, the charging techniques and/or circuitry may determine and/or adjust the boundary conditions of information/data accordingly in order to meet or satisfy the goal reflective of the charge-time parameter. Again, however, in response to enabling or disabling a charge-time parameter, the charging techniques and/or circuitry may implement any charging technique or process in now known or later developed including, for example, implementing a different predetermined charging technique (for example, CCCV, step charging or pulse charging).

In another exemplary embodiment, a user and/or operator may modify (for example, via a user or operator input) a charge-time parameter (for example, charging the battery/cell in such a manner that a given SOC of the battery/cell in or within a given amount of time of charging the battery/cell). For example, the user may modify the charge-time parameter to provide for a greater increase in percentage of SOC (for example, set the parameter to 30% (as compared to a previous parameter of 20%) increase in SOC of the battery/cell in or within 15 minutes of charging the battery/cell) and/or additional time of usage (for example, 20 additional minutes (as compared to a previous parameter 15 additional minutes)) of usage of the battery/cell after 15 minutes of charging of the battery/cell). In this way, the circuitry and techniques, based on or using a charge-time parameter, implement, adapt, change, adjust and/or control one or more characteristics of the charging operation to meet, satisfy and/or comply with a condition or "goal" defined by, associated with or corresponding to the charge-time parameter or change therein. For example, in response to the modification, the charging techniques and/or circuitry may adapt, determine, implement and/or adjust the boundary conditions of information/data accordingly (for example, determine and/or modify boundary conditions of OP, CPV, PRT, $T°_{b/c}$, $T°_{cc}$, $T°_h$, $I_{max}$, $V_{max}$, and/or pulse width of the current or voltage signals (for example, of a step charging sequence)) in order to meet the goal associated with or reflective of the charge-time parameter.

In addition, the control circuitry may employ and/or adjust one or more charge-time parameter(s) in response to certain operating conditions of the battery/cell. For example, based on the state of health (SOH) and/or temperature of the battery/cell, or change(s) therein, the control circuitry may implement, determine, calculate, change, adjust and/or vary a charge-time parameter. The "new" charge-time parameter may be employed by the adaptive charging techniques and/or circuitry of the present inventions to implement, provide, change, adjust and/or control one or more characteristics of the charging signal applied to the battery/cell (for example, in the context of a pulse charging technique, a shape of charge and/or discharge signal (if any), amplitude thereof, duration thereof, duty cycle thereof, rest period (if any) and/or sequence of charge and/or discharge pulses) to meet, satisfy and/or comply with the charge-time parameter (for example, implement, provide and/or apply a charging sequence which, in or within one or more associated periods of time, the battery/cell includes one or more percentages of a SOC and/or one or more amount of usage time of the battery/cell). In this way, the circuitry and techniques, based on or using a SOH and/or temperature of the battery/cell (or change(s) therein) and a different charge-time parameter, implement, change, adjust and/or control one or more characteristics of the charging operation to meet, satisfy and/or comply with a condition or "goal" defined by or corresponding to the "new" charge-time parameter.

As such, one or more charge-time parameter(s) may be fixed or may change, for example, over time, use and/or internal operating conditions (for example, SOH and/or temperature of the battery/cell) and/or external operating conditions (for example, external ambient temperature). In addition thereto, or in lieu thereof, one or more charge-time parameter(s) may be implemented or changed based on one or more responses of the battery/cell to or during the charging process (for example, in view of safety conditions such as the temperature of the battery/cell).

Notably, the SOH of a rechargeable battery/cell (for example, a rechargeable lithium-ion battery/cell, is a parameter that describes, characterizes and/or is representative of the "age" of the battery/cell, the degradation levels of the battery/cell and/or an ability of the battery/cell to hold charge, for example, relative to a given time in operation (for example, the initial time in operation).

In addition thereto, or in lieu thereof, in one embodiment, the boundary conditions of information/data or charging conditions accordingly (for example, determine and/or modify boundary conditions of OP, CPV, PRT, $T°_{b/c}$, $T°_{cc}$, $T°_h$, $I_{max}$, $V_{max}$ and/or pulse width of the current or voltage signals (for example, of a step charging sequence)) for a given operating condition(s) of the battery/cell may change in accordance with the SOH of the battery/cell. In this regard, the suitable boundary conditions of information/data in relation to a charge-time parameter are adapted in accordance with SOH. As such, the adaptive charging techniques and/or circuitry of the present inventions may determine, implement and/or adjust boundary conditions of information/data (for a given SOH) in order to meet the goal associated with or reflective of the charge-time parameter.

In another embodiment, the control circuitry may modify the charging techniques and/or the charge-time parameter in accordance with changes in the maximum available charge that the battery/cell may store or is capable of storing ($Q_{max}$). In this regard, the maximum available charge that a battery/cell may store may change over time as, for example, the battery/cell ages or deteriorates. Moreover, changes in the operating conditions may also impact the battery/cell; for example, changes in temperature may impact $Q_{max}$ (for example, $Q_{max}$ of a battery/cell often decreases with lower temperature). The control circuitry and techniques may incorporate changes in $Q_{max}$ over time when determining and/or implementing a charging sequence that includes one or more charge-time parameter(s). For example, based on a current $Q_{max}$ of the battery/cell, the control circuitry and techniques of the present inventions determines a charge sequence, cycle or operation that meets or satisfies the charge-time parameter. In one embodiment, the control circuitry, based on the current $Q_{max}$ of the battery/cell and the charge-time parameter may implement, determine and/or modify one, some or all boundary conditions or charging sequence of OP, CPV, PRT, $T°_{b/c}$, $T°_{cc}$, $T°_h$, $I°_{max}$, $V_{max}$ and/or pulse width of the current or voltage signals of the charging sequence in order to determine whether and/or how to implement, adapt, modify and/or change a charge sequence, cycle or operation of the battery/cell. In this way, the control circuitry monitors one or more measures of the battery conditions and/or operating/charging considerations (for example, OP, CPV, PRT, $T°_{b/c}$, $T°_{cc}$, $T°_h$, $I_{max}$, $V_{max}$, and/or pulse width of the current or voltage signals (for example, of a step charging sequence)) in order to, if necessary, implement, adapt, modify and/or change a charge sequence, cycle or operation of the battery/cell as well as in order to meet, satisfy and/or comply with a condition or "goal" defined by or corresponding to the charge-time parameter in light of the current $Q_{max}$ of the battery/cell. (See, e.g., FIGS. 5D, 6A-6E and 7).

In this way, one or more of the battery conditions and/or operating considerations may be employed by the adaptive charging techniques and/or circuitry of the present inventions to implement, provide, change, adjust and/or control one or more characteristics of the charging signal applied to the battery/cell (for example, in the context of a pulse charging technique, a shape of charge and/or discharge signal (if any), amplitude thereof, duration thereof, duty cycle thereof, rest period (if any) and/or sequence of charge and/or discharge pulses) to meet, satisfy and/or comply with the charge-time parameter in light of the current $Q_{max}$ of the battery/cell.

In one embodiment, boundary conditions of one or more measures or representation of the battery and/or operating/charging conditions (OP, CPV, PRT, $T°_{b/c}$, $T°_{cc}$, $T°h$, $I_{max}$, $V_{max}$, and/or pulse width of the current or voltage signals) to meet, satisfy and/or comply with the charge-time parameter is/are based on empirical data, test data, simulation data, theoretical data and/or a mathematical relationship. For example, based on empirical data (for example, from a certain cell vendor, manufacturing lot, chemistry and/or design of a battery/cell), the circuitry and techniques (for example, adaptive charging circuitry associated with a given battery/cell) may implement, determine, calculate and/or employ a charging operation having boundary conditions of one or more measures of the battery conditions suitable to meet, satisfy and/or comply with the charging time considerations defined by the charge-time parameter. Notably, data which is representative boundary conditions of one or more measures of the battery conditions in view of a charge-time parameter (and, in on embodiment, in further view of a state and/or operating conditions of the battery/cell (for example, a SOH and/or temperature)) may be stored in memory (internal and/or external memory) for use by the adaptive charging techniques and/or circuitry of the present inventions.

In another embodiment, based on or using initialization, characterization and/or calibration data, the techniques and/or circuitry of the present inventions may implement, determine, calculate, change, adjust and/or vary boundary conditions of one or more measures of the battery conditions and/or charging sequence (for example, OP, CPV, PRT, $T°_{b/c}$, $T°_{cc}$, $T°_h$, $I_{max}$, $V_{max}$ and/or pulse width of the current or voltage signals (for example, of a step charging sequence) to meet, satisfy and/or comply with the charge-time parameter. For example, in one embodiment, based on or using (i) initialization, characterization and/or calibration data and (ii) empirical data, test data, simulation data, theoretical data and/or a mathematical relationship, the adaptive charging techniques and/or circuitry of the present inventions may calculate or determine boundary conditions of one or more measures of the battery conditions to meet, satisfy or comply with the charge-time parameter for a particular or associated battery/cell. Indeed, in one embodiment, the adaptive charging techniques and/or circuitry of the present inventions, based on or using (i) initialization, characterization and/or calibration data and (ii) empirical data, test data, simulation data, theoretical data and/or a mathematical relationship, may calculate or determine a pattern or relationship of (i) boundary conditions of one or more measures of the battery conditions and/or (ii) a change of the characteristics of the charging signal (for example, (a) change based on one or more conditions or states of the battery/cell, or (b) change based on one or more responses of the battery/cell to or during the charging processes).

In yet another embodiment, boundary conditions of one or more measures of the battery conditions or charging sequence (for example, OP, CPV, PRT, $T°_{b/c}$, $T°_{cc}$, $T°_h$, $I_{max}$, $V_{max}$ and/or pulse width of the current or voltage signals (for example, of a step charging sequence) for a particular battery/cell to meet, satisfy and/or comply with the charging time considerations defined by the charge-time parameter may be based on or using initialization, characterization or calibration data of the battery/cell. The initialization, characterization and/or calibration data may be representative of the response of the battery/cell to a characterization sequence. In one embodiment, the characterization sequence may apply charge signals to the battery/cell. Thereafter, the adaptive charging techniques and/or circuitry may evaluate the response to such signals by the battery/cell—including determining, calculating, estimating and/or measuring operating conditions and/or feedback information/data (for example, OP, CPV, PRT, $T°_{b/c}$, $T°_{cc}$, $I_{max}$ and/or $V_{max}$), which may be the actual battery/cell or a representative thereof. Based thereon, the adaptive charging techniques and/or circuitry may determine and/or implement charging signal applied to the battery/cell for a particular battery/cell to meet, satisfy and/or comply with the charging time considerations defined by the charge-time parameter. Such initialization, characterization or calibration data may be obtained, acquired and/or determined, for example, at manufacture, test or calibration which may include the characterization sequence to obtain "unique" data regarding a given battery/cell.

Briefly, the initialization, characterization or calibration sequences may seek to establish values for certain of the predetermined limits and ranges of, for example, operating conditions and/or feedback information/data (for example, OP, CPV, PRT, $T°_{b/c}$, $T°_{cc}$, $T°_h$, $I_{max}$ and/or $V_{max}$). In one embodiment, the initialization, characterization or calibration sequences measure the change in terminal voltage in response to charge and/or discharge packets (having charge and/or discharge pulses) for new cells/batteries over the full range of SOC. Using such information/data, characteristics of the charging signal applied to the battery/cell for a particular battery/cell to meet, satisfy and/or comply with the charging time considerations defined by the charge-time parameter may be determined, estimated and/or calculated.

In another embodiment, these values are used to cycle cells/batteries, and correlation data or tables are generated to correlate the changes in terminal voltage with the capacity fade of the cells/batteries, and consequently with cycle life. Different values may be used on different cells to create more complete correlation relationships between changes in terminal voltage values or ranges and capacity fade. Additionally, the change in terminal voltage values or ranges may be correlated using physical models related to the transport of lithium-ions within the battery/cell.

Notably, the predetermined values and/or ranges of, for example, operating conditions and/or feedback information/data (for example, OP, CPV, PRT, $T°_{b/c}$, $T°_{cc}$, $T°_h$, $I_{max}$ and/or $V_{max}$) and/or characteristics of the charging signal applied to the battery/cell for a particular battery/cell to meet, satisfy and/or comply with the charging time considerations defined by the charge-time parameter may be calculated or determined by the adaptive circuitry and/or processes of the present inventions whether such circuitry is "off-device", "off-chip" or separate from the circuitry of the present inventions. The predetermined values and/or ranges of, for example, operating conditions and/or feedback information/data (for example, OP, CPV, PRT, $T°_{b/c}$, $T°_{cc}$, $T°_h$, $I_{max}$ and/or $V_{max}$) may be stored in memory (for example, in a database or look-up table) during manufacture, test or calibration, and accessible to the adaptive circuitry and/or processes of the present inventions during operation.

In addition to implementing adaptive charging circuitry and techniques to meet, satisfy and/or comply with a charge-time parameter, in certain embodiments the charging techniques and/or circuitry may implement a charging process that reduces adverse impact on a cycle life of the battery/cell within the boundaries of the charge time constraints. Here, the adaptive charging circuitry according to certain aspects of the present inventions implement adaptive charging techniques which seek to (i) meet, satisfy and/or comply with a charge-time parameter and (ii) maximize and/or increase the cycle life of the battery/cell (by, for example, minimizing and/or reducing degradation mechanisms of the charging operation within the boundaries of the meeting charge time constraints).

Notably, the inventions directed to adaptively charging a battery/cell using a charge-time parameter may be employed in conjunction with the inventions directed to adaptively charging a battery/cell using, among other things, data which is representative of a charge pulse voltage (CPV) (and/or a change in the CPV) and/or data which is representative of temperature of, for example, charging circuitry employed to charge the battery/cell and/or data which is representative of temperature of, for example, the battery/cell and/or circuitry consuming the power output by the battery/cell. Indeed, the adaptive charging techniques and/or circuitry of the present inventions may be implemented or employed with the inventions or embodiments described and/or illustrated in U.S. patent application Ser. Nos. 13/366,352, 13/626,605, 13/657,841, 13/747,914 and/or 13/836,235—again, which are incorporated by reference herein.

There are many inventions described and illustrated herein. While certain embodiments, features, attributes and advantages of the inventions have been described and illustrated, it should be understood that many others, as well as different and/or similar embodiments, features, attributes and advantages of the present inventions, are apparent from the description and illustrations. As such, the embodiments, features, attributes and advantages of the inventions described and illustrated herein are not exhaustive and it should be understood that such other, similar, as well as different, embodiments, features, attributes and advantages of the present inventions are within the scope of the present inventions.

Indeed, the present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof.

Although the charge-time parameter has often been described as defining, correlating and/or associating a charge time period to (i) a state of charge (SOC) of the battery/cell and/or (ii) a charge storage level corresponding to an amount of usage time of the battery/cell, the techniques and/or circuitry may employ the charge-time parameter to implement, adapt, modify and/or change a charge sequence, cycle or operation of the battery/cell to provide a range of SOC of the battery/cell within a given range of time of charging the battery/cell and/or (ii) a range of charge storage level corresponding to usage time of the battery/cell within a range of time of charging the battery/cell. For example, in one embodiment, the adaptive charging techniques and/or circuitry uses and/or employs a charge-time parameter, (which may also be in connection with certain considerations, constraints and/or requirements), to provide, implement, adapt, modify and/or change a charge sequence, cycle or operation of the battery/cell to provide (i) an SOC (+/−a certain percentage thereof) of the battery/cell in an amount of time (+/−a certain percentage thereof) of charging the battery/cell and/or (ii) a charge storage level corresponding to an amount of usage time (+/−a certain percentage thereof) of the battery/cell in an amount of time (+/−a certain percentage thereof) of charging the battery/cell.

In addition, although many of the embodiments described and/or illustrated herein have been described in the context of a plurality of charge-time parameters, the control circuitry and techniques of the present inventions may employ one charge-time parameter or a plurality of charge-time parameters for any given charging sequence. Indeed, in one embodiment, the control circuitry and techniques may, in a first charge sequence, employ a plurality of charge-time parameters and a second charge sequence (which may be before or after the first sequence), employ a one charge-time parameter for all or a portion of that second charge sequence.

In one embodiment, the control circuitry and techniques of the present inventions may employ the charge-time parameter (or data which is representative thereof) in a architecture whereby such control circuitry and techniques may evaluate the SOC and/or changes therein, during the charging sequence (based on or using the charge-time parameter) and/or at the conclusion of the period associated with the charge-time parameter to determine, implement, adapt, modify and/or change the charge process to address the actual results of the charging sequence, cycle or operation. For example, during the charging process, the monitoring circuitry may provide data to the control circuitry to evaluate the SOC and/or changes therein to determine whether the charge sequence, cycle or operation is expected to meet or satisfy the charge-time parameter. Here, the control circuitry and techniques may extrapolate, based on among other things, an SOC and/or changes therein and the charging sequence, to determine whether the charging operation will meet or satisfy a predetermined charge time in relation to (i) a predetermined state of charge (SOC) of the battery/cell and/or (ii) an amount of usage time of the battery/cell (in relation to a given load (i.e., a given current consumption of, for example, an associated electrical device)) defined by the charge-time parameter. In those instances where the charge sequence is determined to not meet the goal defined by the charge-time parameter, the control circuitry and techniques of the present inventions may adapt the charge sequence, cycle or operation in order to meet the goal, for example, within a prescribed or expected time, or reduce and/or minimize the failure to meet the goal. Here, the control circuitry and techniques may determine that the charging sequence is (i) too slow and the amount of charge stored in the battery was less than the goal associated with corresponding to the charge-time parameter or (ii) too fast and the amount of charge stored in the battery was more than the goal associated with or corresponding to the charge-time parameter.

In response thereto, the control circuitry may implement adjustments to the charging operation to modify or adapt the charging sequence (via control signals to the charging circuitry) and/or modify or adjust one or more boundary conditions of one or more measures of the battery conditions or charging sequence (for example, OP, CPV, PRT, $T°_{b/c}$, $T°_{cc}$, $T°_{11}$, $I_{max}$, $V_{max}$ and/or pulse width of the current or voltage signals (for example, of a step charging sequence)) so that the charging operation meets or satisfies a predetermined charge time in relation to (i) a predetermined state of charge (SOC) of the battery/cell and/or (ii) a charge storage level corresponding to an amount of usage time of the battery/cell (in relation to a given load (i.e., a given current consumption of, for example, an associated electrical device)) defined by the charge-time parameter.

Notably, the control circuitry and techniques may adapt the charge sequence, cycle or operation based on the techniques described herein or any techniques now known or later developed.

Figure 10:
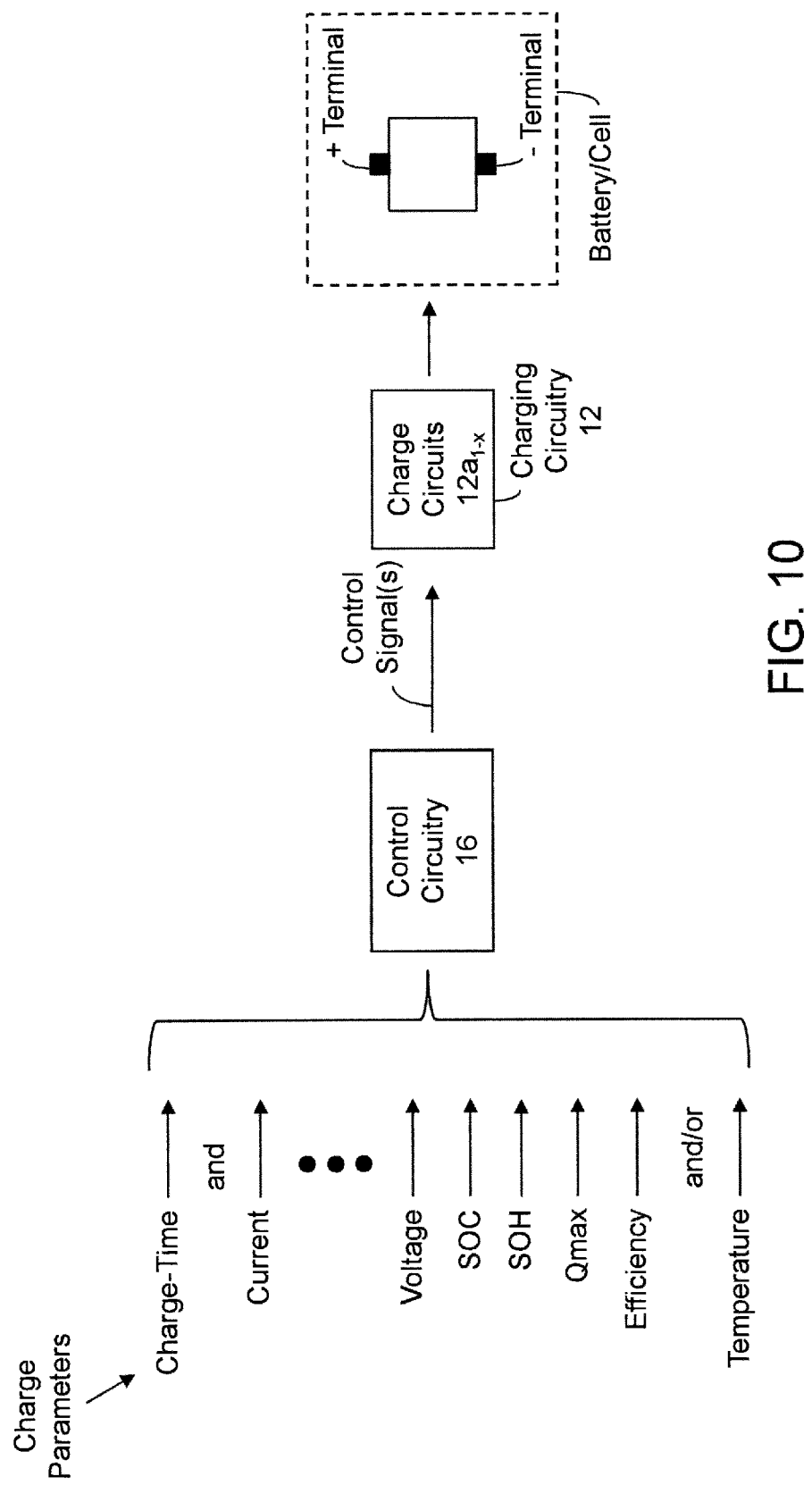
FIG. 10 illustrates block diagram representation of exemplary adaptive charging circuitry in conjunction with a battery/cell, according to at least certain aspects of certain embodiments of the present inventions, wherein the control circuitry may employ a charge-time parameter, among other parameters/considerations, to generate control signals which are employed to control, adapt, modify and/or implement one or more characteristics of the charge or current applied to or injected into the battery/cell and wherein the charging circuitry includes a plurality of charge circuits as described and/or illustrated in U.S. Provisional Patent Application Ser. No. 61/860,382 and U.S. patent application Ser. No. 14/075,667, both of which are incorporated herein by reference.

In addition thereto, or in lieu thereof, the control circuitry and techniques, when evaluating the SOC (and/or changes therein) at the conclusion of the charge sequence or period associated with the charge-time parameter, may determine whether and/or why the charging operation did not meet or satisfy the charge-time parameter (for example, the charging sequence was too slow or too fast. In response, the control circuitry and techniques may implement adjustments to the charging operation during the remainder of the charge cycle (if any) and/or the next charge cycle associated with the charge-time parameter. For example, the control circuitry and techniques of the present inventions, during the next charging cycle, may modify and/or employ different operating conditions and/or feedback information/data (for example, OP, CPV, PRT, $T°_{b/c}$, $T°_{cc}$, $I_{max}$, $V_{max}$ and/or pulse width of the current or voltage signals (for example, of a step charging sequence)) and/or characteristics of the charging signal applied to the battery/cell to meet, satisfy and/or comply with or to more fully meet, satisfy and/or comply with the charging time considerations defined by the charge-time parameter, In another embodiment, the charging circuitry includes a plurality of charge circuits (see FIG. 10) like those embodiments described and/or illustrated in U.S. Provisional Patent Application Ser. No. 61/860,382 and U.S. patent application Ser. No. 14/075,667, both of which are incorporated herein by reference. Here, the present inventions may be implemented in conjunction with any of the embodiments of the aforementioned applications. For example, the control circuitry and techniques of the present inventions may employ the charge-time parameter to determine, control and/or implement one or more operating characteristics of one or more (or all) of the plurality of charge circuits of the charging circuitry as described and/or illustrated in U.S. Provisional Patent Application Ser. No. 61/860,382 and U.S. patent application Ser. No. 14/075,667. Indeed, in one embodiment, the control circuitry and techniques of the present inventions may determine, calculate and/or implement a charging sequence, based on a given charge-time parameter and operating conditions and/or feedback information/data of the (i) operating temperature(s) of such charge circuits, (ii) operating temperature(s) of electronic device housing and/or (iii) operating efficiency(ies) of such charge circuits. (See, e.g. FIG. 10). Here, the control circuitry and techniques may determine, adapt, change, calculate and/or implement (i) operating temperature(s) of such charge circuits, (ii) operating temperature(s) of electronic device housing and/or (iii) operating efficiency(ies) of such charge circuits during the charging sequence in order to meet or satisfy the charging time considerations defined by the charge-time parameter. In addition thereto, the control circuitry and techniques may also determine, calculate and/or implement, based on the given charge-time parameter, other operating or charging conditions and/or feedback information/data (for example, OP, CPV, PRT, $T°_{b/c}$, $T°_{cc}$, $T°_h$, $I_{max}$, $V_{max}$ and/or pulse width of the current or voltage signals (for example, of a step charging sequence)) in those architectures where the charging circuitry includes a plurality of charge circuits. (See, e.g. FIG. 10 and the architectures described and/or illustrated in U.S. Provisional Patent Application Ser. No. 61/860,382 and U.S. patent application Ser. No. 14/075,667).

For the avoidance of doubt, all permutations and combinations of the inventions described and illustrated herein may be employed in conjunction with the permutations and combinations of the inventions described and illustrated Provisional Patent Application Ser. No. 61/860,382 and U.S. patent application Ser. No. 14/075,667. For the sake of brevity, such permutations and combinations will not be discussed, in detail, separately herein.

Notably, "circuitry", means, among other things, a circuit (whether integrated or otherwise), a group of such circuits, one or more processors, one or more state machines, one or more processors implementing software, one or more gate arrays, programmable gate arrays and/or field programmable gate arrays, or a combination of one or more circuits (whether integrated or otherwise), one or more state machines, one or more processors, one or more processors implementing software, one or more gate arrays, programmable gate arrays and/or field programmable gate arrays. The term "data" means, among other things, a current or voltage signal(s) (plural or singular) whether in an analog or a digital form, which may be a single bit (or the like) or multiple bits (or the like).

Further, control circuitry (employed to implement the operations and/or techniques described herein) may perform or execute one or more applications, routines, programs and/or data structures that implement particular methods, techniques, tasks or operations described and illustrated herein. The functionality of the applications, routines or programs may be combined or distributed. In addition, the applications, routines or programs may be implemented by the control circuitry using any programming language whether now known or later developed, including, for example, assembly, FORTRAN, C, C++, and BASIC, whether compiled or uncompiled code; all of which are intended to fall within the scope of the present inventions.

Moreover, monitoring circuitry and control circuitry (which is employed to implement the operations and/or techniques described herein) may share circuitry with each other as well as with other elements. Moreover, such circuitry may be distributed among a plurality of integrated circuits which may also perform one or more other operations, which may be separate and distinct from that described herein.

The memory which stores the data, equations, relationships, and/or look up table may be a permanent, semi-permanent or temporary (i.e., until re-programmed) storage that is discrete or resident on (i.e., integrated in), for example, the control circuitry. As such, in one embodiment, the memory may be one time programmable, or data, equations, relationships, and/or look up table employed by the control circuitry may be one time programmable (for example, programmed during test or at manufacture). In another embodiment, the memory is more than one time programmable and, as such, the predetermined values and/or band limits employed by the control circuitry may be modified after test and/or manufacture.

Many modifications, variations, combinations and/or permutations are possible in light of the above teaching. For example, although certain exemplary embodiments and/or techniques are described and/or illustrated in the context of circuitry for and techniques for pulse charging (see, for example, FIGS. 2A-2D, 3A-3P, 8A-8D and 9A-9D), the present inventions may be employed in the context of CCCV and/or step charging (see, for example, FIGS. 4A and 4B, respectively), or any other charging technique now known or later developed. Thus, regardless of the charging technique, implementing one or more of the features of the present inventions as described herein, are intended to fall within the scope of the present inventions. Thus, it is to be understood that other embodiments may be utilized and operational changes may be made without departing from the scope of the present inventions. As such, the foregoing description of the exemplary embodiments of the inventions has been presented for the purposes of illustration and description. It is intended that the scope of the inventions not be limited solely to the description above.

It should be further noted that the various circuits and circuitry disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and HLDL, formats supporting register level description languages like RTL, and formats supporting geometry description languages such as GDSII, GDSIII, GDSIV, CIF, MEBES and any other formats and/or languages now known or later developed. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Indeed, when received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

Moreover, the various circuits and circuitry, as well as techniques, disclosed herein may be represented via simulations using computer aided design and/or testing tools. The simulation of the charging circuitry, control circuitry and/or monitoring circuitry, and/or techniques implemented thereby, may be implemented by a computer system wherein characteristics and operations of such circuitry, and techniques implemented thereby, are imitated, replicated and/or predicted via a computer system. The present inventions are also directed to such simulations of the inventive charging circuitry, control circuitry and/or monitoring circuitry, and/ or techniques implemented thereby, and, as such, are intended to fall within the scope of the present inventions. The computer-readable media corresponding to such simulations and/or testing tools are also intended to fall within the scope of the present inventions.

Notably, reference herein to "one embodiment" or "an embodiment" means that a particular feature, structure, or characteristic described in connection with the embodiment may be included, employed and/or incorporated in one, some or all of the embodiments of the present inventions. The usages or appearances of the phrase "in one embodiment" or "in another embodiment" in the specification are not referring to the same embodiment, nor are separate or alternative embodiments necessarily mutually exclusive of one or more other embodiments, nor limited to a single exclusive embodiment. The same applies to the term "implementation." The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein.

Further, an embodiment or implementation described herein as exemplary is not to be construed as preferred or advantageous, for example, over other embodiments or implementations; rather, it is intended convey or indicate the embodiment or embodiments are example embodiment(s).

In the claims, the term "determine" and "calculate" and other forms thereof (i.e., determining, determined and the like or calculating, calculated and the like) means, among other things, calculate, assesses, determine and/or estimate and other forms thereof. Further, the term "battery" means an individual cell (which stores energy) and/or a plurality of cells arranged electrically in a series and/or parallel configuration.

In the claims, the term "determine" and other forms (i.e., determining, determined and the like) means, among other things, calculate, assesses, determine and/or estimate and other forms thereof. Further, the term "battery" means an individual cell (which stores energy) and/or a plurality of cells arranged electrically in a series and/or parallel configuration. The term "out-of-specification", in the claims, means the condition, parameter, information and/or data is greater than a predetermined upper limit, less than a predetermined lower limit and/or outside a predetermined range. The term "within-specification" and "in-specification", collectively in the claims as "in-specification", means the condition, parameter, information and/or data is not "out-of-specification".

In addition, the terms "first," "second," and the like, herein do not denote any order, quantity, or importance, but rather are used to distinguish one element from another. Moreover, the terms "a" and "an" herein do not denote a limitation of quantity, but rather denote the presence of at least one of the referenced item. Further, the term "data" may mean, among other things, a current or voltage signal(s) whether in analog or a digital form (which may be a single bit (or the like) or multiple bits (or the like)).

As used in the claims, the terms "comprises," "comprising," "includes," "including," "have," and "having" or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of charging a battery, the method comprising:
   (a) setting a first charge-time parameter specifying a time to reach a state of charge of the battery, wherein setting the first charge-time parameter includes reading, from memory, one or more characteristics of a first charging signal, and wherein the one or more characteristics determine the state of charge of the battery associated with the first charge-time parameter within a charge time period corresponding to the first charge-time parameter;

(b) applying the first charge signal to the battery, wherein the first charge signal is calculated to charge the battery as required by the first charge-time parameter;

(c) measuring, after applying at least a portion of the first charge signal, a plurality of voltage values and/or current values between two terminals of the battery;

(d) calculating feedback information from the plurality of voltage values and/or current values, the feedback information being selected from the group consisting of an overpotential of the battery, a charge pulse voltage or a change therein, a relaxation time of the battery, and any combination thereof;

(e) determining a second charge signal using the feedback information, wherein an adjustment from the first charge signal to the second charge signal improves a cycle life of the battery; and (f) applying the second charge signal to the battery.

2. The method of claim 1, wherein the second charge signal charges the battery in a manner that continues to meet the requirement of the first charged-time parameter.

3. The method of claim 1, wherein the adjustment from the first charge signal to the second charge signal reduces the capacity fade of the battery.

4. The method of claim 1, wherein the second charge signal charges the battery in a manner that does not meet the requirement of the first charged-time parameter.

5. The method of claim 1, wherein the adjustment is selected from the group consisting of a change in charge signal shape, a change in charge signal duration, a change in charge signal magnitude, and any combination thereof.

6. The method of claim 1, wherein the adjustment is selected from the group consisting of a change in charge pulse shape, a change in charge pulse duration, a change in charge pulse magnitude, a change in charge pulse frequency, and any combination thereof.

7. The method of claim 1, wherein applying the first charge signal to the battery produces a non-linear increase in the state of charge of the battery.

8. The method of claim 1, wherein the first charge signal comprise a pulse charging signal or a step charging signal.

9. The method of claim 1, wherein determining the second charge signal using the feedback information comprises: determining that the feedback information exceeds a predetermined range associated with a desired cycle life of the battery, and determining the second charge signal will restore the feedback information to the predetermined range.

10. The method of claim 1, wherein determining the second charge signal using the feedback information comprises determining the second charge signal using the feedback information and a temperature parameter based on a temperature of the battery or a temperature of a charging environment of the battery.

11. The method of claim 10, further comprising, before (e), measuring the temperature of the battery or the temperature of the charging environment of the battery.

12. The method of claim 10, wherein the charging environment of the battery comprises a charger device housing and/or a charger circuitry.

13. The method of claim 1, wherein setting the first charge-time parameter includes reading, from memory, one or more characteristics of the first charging signal that
determine the charge storage level corresponding to a usage time of the battery associated with the first charge-time parameter within the charge time period corresponding to the first charge-time parameter.

14. The method of claim 1, wherein setting the first charge-time parameter includes reading, from memory, data which is representative boundary conditions of one or more measures of the battery response.

15. The method of claim 1, wherein setting the first charge-time parameter includes reading, from memory, data of predetermined values or ranges of a plurality of operating conditions or feedback information.

16. An apparatus for charging a battery, the apparatus comprising: charging circuitry configured to be coupled to the battery, monitoring circuitry configured to be coupled to the battery, and control circuitry coupled to the charging circuitry and the monitoring circuitry, wherein the control circuitry is configured to:

(a) control the charging circuitry to apply a first charge signal to the battery, wherein the first charge signal is calculated to charge the battery as required by a first charged-time parameter, and wherein the first charge-time parameter specifies a time to reach a state of charge of the battery, and wherein setting the first charge-time parameter includes reading, from memory, one or more characteristics of a first charging signal, and wherein the one or more characteristics determine the state of charge of the battery associated with the first charge-time parameter within a charge time period corresponding to the first charge-time parameter;

(b) receive, after at least a portion of the first charge signal is applied, a plurality of voltage values and/or current values obtained via the monitoring circuitry and from between two terminals of the battery;

(c) calculate feedback information from the plurality of voltage values and/or current values, the feedback information being selected from the group consisting of an overpotential of the battery, a charge pulse voltage or a change therein, a relaxation time of the battery, and any combination thereof;

(d) determine a second charge signal using the feedback information, wherein an adjustment from the first charge signal to the second charge signal improves a cycle life of the battery; and (e) control the charging circuitry to apply the second charge signal to the battery.

17. The apparatus of claim 16, wherein the second charge signal charges the battery in a manner that continues to meet the requirement of the first charge-time parameter.

18. The apparatus of claim 16, wherein the adjustment from the first charge signal to the second charge signal reduces the capacity fade of the battery.

19. The apparatus of claim 16, wherein the second charge signal charges the battery in a manner that does not meet the requirement of the first charge-time parameter.

20. The apparatus of claim 16, wherein the adjustment is selected from the group consisting of a change in charge signal shape, a change in charge signal duration, a change in charge signal magnitude, and any combination thereof.

21. The apparatus of claim 16, wherein the adjustment is selected from the group consisting of a change in charge pulse shape, a change in charge pulse duration, a change in charge pulse magnitude, a change in charge pulse frequency, and any combination thereof.

22. The apparatus of claim 16, wherein applying the first charge signal to the battery produces a non-linear increase in the state of charge of the battery.

23. The apparatus of claim 16, wherein the first charge signal comprise a pulse charging signal or a step charging signal.

24. The apparatus of claim 16, wherein determining the second charge signal using the feedback information comprises: determining that the feedback information exceeds a predetermined range associated with a desired cycle life of the battery, and determining the second charge signal will restore the feedback information to the predetermined range.

25. The apparatus of claim 16, wherein determining the second charge signal using the feedback information comprises determining the second charge signal using the feedback information and a temperature parameter based on a temperature of the battery or a temperature of a charging environment of the battery.

26. The apparatus of claim 25, the control circuitry being further configured to, before (e), control the monitoring circuitry to measure the temperature of the battery or the temperature of the charging environment of the battery.

27. The apparatus of claim 25, wherein the charging environment of the battery comprises a charger device housing and/or a charger circuitry.

28. The apparatus of claim 16, wherein the control circuitry is further configured to set the first charge-time parameter by reading, from memory, one or more characteristics of the first charging signal that determine a charge storage level corresponding to a usage time of the battery associated with the first charge-time parameter within the charge time period corresponding to the first charge-time parameter.

* * * * *